United States Patent
Graves et al.

(10) Patent No.: US 11,059,480 B2
(45) Date of Patent: Jul. 13, 2021

(54) COLLISION AVOIDANCE SYSTEM WITH ELEVATION COMPENSATION

(71) Applicant: Caterpillar Inc., Deerfield, IL (US)

(72) Inventors: Nolan A. Graves, Peoria, IL (US); David K. Turner, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 271 days.

(21) Appl. No.: 16/396,035

(22) Filed: Apr. 26, 2019

(65) Prior Publication Data

US 2020/0339117 A1    Oct. 29, 2020

(51) Int. Cl.
| | |
|---|---|
| *B60W 30/095* | (2012.01) |
| *G05D 1/02* | (2020.01) |
| *B60W 40/076* | (2012.01) |
| *B60W 10/18* | (2012.01) |

(52) U.S. Cl.
CPC ...... *B60W 30/0956* (2013.01); *B60W 40/076* (2013.01); *G05D 1/0257* (2013.01); *B60W 10/18* (2013.01); *B60W 2420/42* (2013.01); *B60W 2420/52* (2013.01); *G05D 1/0238* (2013.01)

(58) Field of Classification Search
CPC ............ B60W 10/18; B60W 2420/42; B60W 2420/52; B60W 2552/15; B60W 2552/20; B60W 30/0953; B60W 30/0956; B60W 40/076; G05D 1/0238; G05D 1/0257
See application file for complete search history.

(56) References Cited

U.S. PATENT DOCUMENTS

| | | | | |
|---|---|---|---|---|
| 5,832,400 | A * | 11/1998 | Takahashi | B60W 30/18 701/53 |
| 5,901,806 | A * | 5/1999 | Takahashi | B60T 7/22 180/170 |
| 6,278,928 | B1 * | 8/2001 | Aruga | F16H 59/66 701/65 |
| 6,292,737 | B1 * | 9/2001 | Higashimata | B60W 30/16 701/96 |
| 6,679,807 | B2 * | 1/2004 | Kato | B60K 31/0008 477/107 |
| 6,732,039 | B2 * | 5/2004 | Ino | B60K 31/0008 701/93 |

(Continued)

FOREIGN PATENT DOCUMENTS

| | | |
|---|---|---|
| CN | 205686391 U | 11/2016 |
| JP | 2014-93018 A | 5/2014 |

*Primary Examiner* — Babar Sarwar
(74) *Attorney, Agent, or Firm* — Leydig, Voit & Mayer, Ltd.

(57) ABSTRACT

A propulsion and collision avoidance system is associated with a machine operating on the ground, and is configured to determine whether a collision will occur based upon the pose and movement of the machine and the pose of the obstacle. The slope of a straight line between the machine and the obstacle is determined based upon the pose of the machine and the pose of the obstacle, and the slope of the straight line is compared to a slope threshold. A collision alert is generated after determining that a collision will occur and when the slope of the straight line is less than the slope threshold, and continuing propulsion commands are generated to propel the machine along the work surface after determining that a collision will occur and when the slope of the straight line is greater than the slope threshold.

20 Claims, 13 Drawing Sheets

(56) References Cited

U.S. PATENT DOCUMENTS

| | | | | |
|---|---|---|---|---|
| 6,847,887 B1* | 1/2005 | Casino | G01C 21/32 | 340/995.18 |
| 6,856,897 B1* | 2/2005 | Phuyal | G06T 17/05 | 701/461 |
| 7,092,811 B2* | 8/2006 | Ishizu | B60K 31/047 | 701/93 |
| 7,634,452 B2* | 12/2009 | Adachi | G08G 1/096775 | 706/45 |
| 7,848,886 B2* | 12/2010 | Kawasaki | B60R 21/013 | 701/301 |
| 7,966,115 B2* | 6/2011 | Bellinger | F16H 61/0213 | 701/55 |
| 8,248,295 B2* | 8/2012 | Tsunekawa | G01S 13/87 | 342/70 |
| 8,935,068 B2* | 1/2015 | Kresse | F16H 61/0213 | 701/65 |
| 10,486,692 B2* | 11/2019 | Nishimura | B60W 30/09 | |
| 2004/0090117 A1* | 5/2004 | Dudeck | B60W 10/18 | 303/191 |
| 2007/0112516 A1* | 5/2007 | Taniguchi | G08G 1/167 | 701/301 |
| 2007/0173372 A1* | 7/2007 | Ueno | B60W 30/18072 | 477/3 |
| 2007/0288133 A1* | 12/2007 | Nishira | G05D 1/0246 | 701/23 |
| 2008/0059037 A1* | 3/2008 | Isaji | B60W 40/076 | 701/93 |
| 2008/0167161 A1* | 7/2008 | Mitchell | B60W 10/11 | 477/94 |
| 2009/0099728 A1* | 4/2009 | Ichinose | B62D 15/0265 | 701/39 |
| 2013/0226432 A1* | 8/2013 | Tsuruta | B60W 30/165 | 701/96 |
| 2015/0003087 A1* | 1/2015 | Futamura | B60Q 9/008 | 362/466 |
| 2016/0039411 A1* | 2/2016 | Park | G01S 13/87 | 701/70 |
| 2016/0152268 A1* | 6/2016 | Baek | B62D 15/0285 | 701/41 |
| 2017/0057498 A1* | 3/2017 | Katoh | B60W 10/184 | |
| 2017/0186319 A1* | 6/2017 | Tsushima | G08G 1/166 | |
| 2017/0210382 A1* | 7/2017 | Nishimura | B60W 30/09 | |
| 2017/0313297 A1* | 11/2017 | Okada | B60W 40/04 | |
| 2017/0343650 A1* | 11/2017 | Kanemaru | G01S 13/931 | |
| 2018/0158334 A1* | 6/2018 | Perez Barrera | G08G 1/166 | |
| 2018/0178783 A1* | 6/2018 | Saiki | G08G 1/165 | |
| 2018/0178789 A1* | 6/2018 | Nishimura | G08G 1/161 | |
| 2018/0342160 A1* | 11/2018 | Komori | G06K 9/00791 | |
| 2019/0031202 A1* | 1/2019 | Takeda | B60T 8/171 | |
| 2019/0094856 A1* | 3/2019 | Kawate | B60W 50/082 | |
| 2019/0100215 A1* | 4/2019 | Ishigami | B60W 40/06 | |
| 2019/0270448 A1* | 9/2019 | Takasao | B60W 10/18 | |
| 2019/0384293 A1* | 12/2019 | Yoo | B60W 40/06 | |
| 2020/0070718 A1* | 3/2020 | Tani | B60W 50/14 | |

* cited by examiner

COLLISION AVOIDANCE SYSTEM WITH ELEVATION COMPENSATION

TECHNICAL FIELD

This disclosure relates generally to collision avoidance systems for ground based machines and, more particularly, to a collision avoidance system that utilizes elevation differences between a machine and an obstacle as a component of the collision avoidance analysis.

BACKGROUND

Machines such as haul trucks, articulated trucks, scrapers, pickup trucks, automobiles, and other types of machines often travel along a ground or work surface at a work site or along road to perform any of a plurality of desired tasks or operations. Collision avoidance systems are useful to avoid collisions between a moving machine and an obstacle. When both the machine and the obstacle (such as another machine) are moving, the analysis to be performed by the collision avoidance system may become more complex.

Changes in elevation may, in some instances, further increase the complexity of the collision avoidance analysis. For example, an elevation difference between a machine and an obstacle may result in the collision avoidance system failing to provide sufficient stopping distance. In another example, the collision avoidance system may generate a collision alert when no such collision is going to occur such as when the machines are approaching at substantially different elevations (e.g., one machine is on an overpass).

Further adding to the complexity of the collision avoidance analysis are instances in which the collision avoidance system does not have access to a map of the work surface. This may occur due to the machine operating at an unmapped work site, at a work site in which specific roads or paths are not designated, or in instances in which mapping data is temporarily unavailable.

U.S. Pat. No. 8,935,068 discloses a collision avoidance system that includes at least one sensor to detect an object so as to determine a detected object location, and a map database including a plurality of intersecting links, and denoting overpass locations. A locator device coupled to the map database is configured to detect the current position coordinates of the vehicle within the map database. The system also includes an electronic control unit coupled to the sensor, database, and device, and configured to autonomously execute a warning assessment algorithm and compare the detected object location with the overpass locations, so as to determine whether the detected object location is generally at an overpass location, and modify the warning assessment algorithm when the detected object location is at a general overpass location. The system further generates a warning or initiates a mitigating action when upon detecting a potential collision.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a propulsion and collision avoidance system associated with a machine includes a ground engaging drive mechanism, a pose sensor, a movement sensor, an object detection sensor, and a controller. The ground engaging drive mechanism is configured to engage a work surface and propel the machine about the work surface. The pose sensor is configured to generate pose data indicative of a pose of the machine. The movement sensor is configured to generate movement data of the machine indicative of movement of the machine. The object detection sensor is configured to generate object detection data indicative of a pose of an obstacle spaced from the machine. The controller is configured to access a slope threshold defining a maximum magnitude of a slope of a work surface, generate propulsion commands to cause the ground engaging drive mechanism to propel the machine along the work surface, determine the pose of the machine based upon the pose data from the pose sensor, determine the movement of the machine based upon the movement data from the movement sensor, and determine the pose of the obstacle based upon the object detection data from the object detection sensor. The controller is further configured to determine whether a collision will occur between the machine and the obstacle based upon the pose and the movement of the machine and the pose of the obstacle, determine a magnitude of the slope of a straight line between the machine and the obstacle based upon the pose of the machine and the pose of the obstacle, compare the magnitude of the slope of the straight line to the slope threshold, generate a collision alert after determining that a collision between the machine and the obstacle will occur and when the magnitude of the slope of the straight line is less than the slope threshold, and generate continuing propulsion commands to continue to cause the ground engaging drive mechanism to propel the machine along the work surface after determining that a collision between the machine and the obstacle will occur and when the magnitude of the slope of the straight line is greater than the slope threshold.

In another aspect, a method of propelling a machine and avoiding a collision between the machine and an obstacle includes accessing a slope threshold defining a maximum magnitude of a slope of a work surface, generating propulsion commands to cause a ground engaging drive mechanism to engage the work surface and propel the machine along the work surface, determining a pose of the machine based upon a pose data from a pose sensor, determining a movement of the machine based upon movement data from a movement sensor, determining a pose of the obstacle based upon object detection data from an object detection sensor. The method further includes determining whether a collision will occur between the machine and the obstacle based upon the pose and the movement of the machine and the pose of the obstacle, determining a magnitude of a slope of a straight line between the machine and the obstacle based upon the pose of the machine and the pose of the obstacle, comparing the magnitude of the slope of the straight line to the slope threshold, generating a collision alert after determining that a collision between the machine and the obstacle will occur and when the magnitude of the slope of the straight line is less than the slope threshold, and generating continuing propulsion commands to continue to cause the ground engaging drive mechanism to propel the machine along the work surface after determining that a collision between the machine and the obstacle will occur and when the magnitude of the slope of the straight line is greater than the slope threshold.

In still another aspect, a machine includes a ground engaging drive mechanism, a prime mover, a pose sensor, a movement sensor, an object detection sensor, and a controller. The ground engaging drive mechanism is configured to engage a work surface and propel the machine about the work surface. The prime mover being operatively connected to the ground engaging drive mechanism. The pose sensor is configured to generate pose data indicative of a pose of the machine. The movement sensor is configured to generate movement data of the machine indicative of movement of the machine. The object detection sensor is configured to generate object detection data indicative of a pose of an obstacle spaced from the machine. The controller is configured to access a slope threshold defining a maximum magnitude of a slope of a work surface, generate propulsion commands to cause the ground engaging drive mechanism to propel the machine along the work surface, determine the pose of the machine based upon the pose data from the pose sensor, determine the movement of the machine based upon the movement data from the movement sensor, and determine the pose of the obstacle based upon the object detection data from the object detection sensor. The controller is further configured to determine whether a collision will occur between the machine and the obstacle based upon the pose and the movement of the machine and the pose of the obstacle, determine a magnitude of a slope of a straight line between the machine and the obstacle based upon the pose of the machine and the pose of the obstacle, compare the magnitude of the slope of the straight line to the slope threshold, generate a collision alert after determining that a collision between the machine and the obstacle will occur and when the magnitude of the slope of the straight line is less than the slope threshold, and generate continuing propulsion commands to continue to cause the ground engaging drive mechanism to propel the machine along the work surface after determining that a collision between the machine and the obstacle will occur and when the magnitude of the slope of the straight line is greater than the slope threshold.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1:
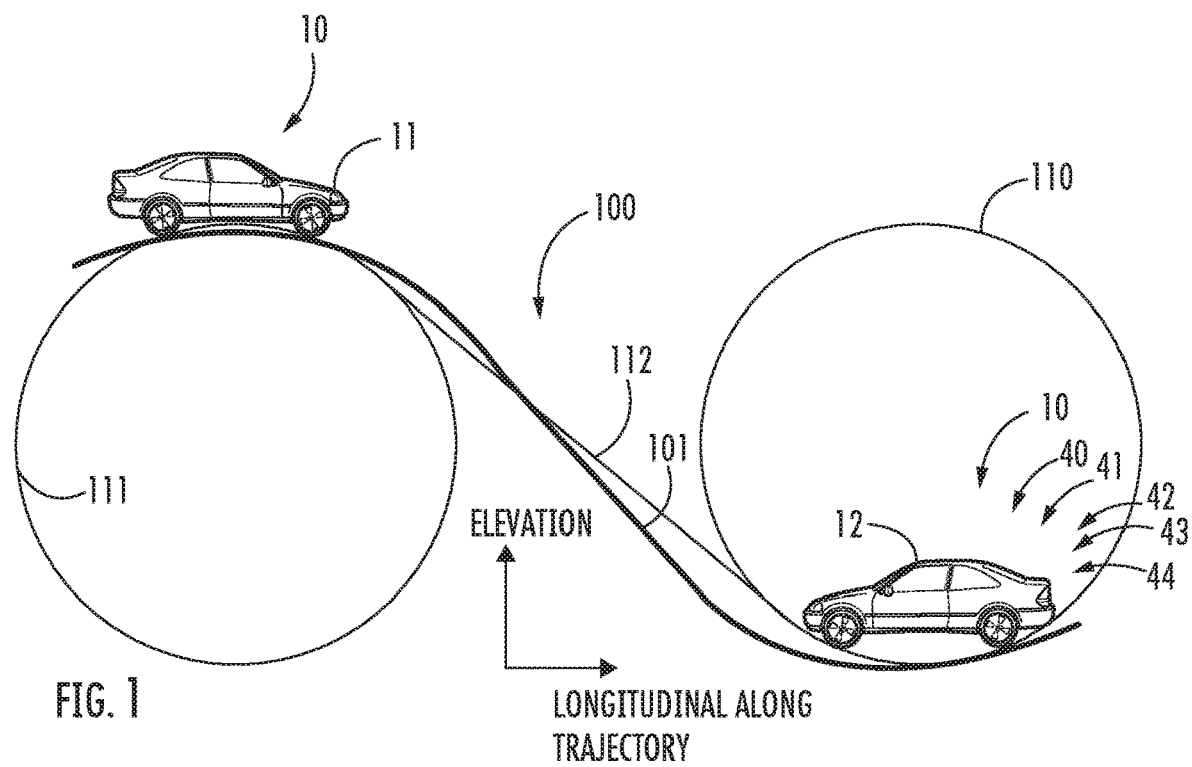
FIG. 1 depicts a schematic illustration of a pair of machines operating at a work site.

FIG. 1 illustrates a pair of machines 10 operating at an exemplary work site 100 with one of the machines 10 including a collision avoidance system 36 as described in more detail below. The work site 100 may include, for example, a mine site, a landfill, a quarry, a construction site, a road work site, or any other type of work site. Machines 10 may perform any of a plurality of desired operations or tasks at the work site 100, and such operations or tasks may require the machine to generally traverse the work site. In an embodiment, the machines 10 may be operating at the work site 100 without access to a map of the work site. The lack of access to a map may be due to any cause, such as the work site not having defined roads or areas or due to an interruption in communications with a system having a map.

The machines 10 may have any desired configuration configurations such as dozers, excavators, haul trucks, or any other machine capable of moving about a work site 100 along a work surface 101. In addition, as depicted in FIG. 1, the machines may be configured as automobiles operating on a work surface 101 such as a road. Any number of machines 10 may simultaneously operate at the work site 100.

The machines 10 may be configured to be operated autonomously, semi-autonomously, or manually. As used herein, a machine 10 operating in an autonomous manner operates automatically based upon information received from various sensors without the need for human operator input. A machine 10 operating semi-autonomously includes an operator, either within the machine or remotely, who performs some tasks or provides some input and other tasks are performed automatically and may be based upon information received from various sensors. A machine 10 being operated manually is one in which an operator is controlling all or essentially all of the functions of the machine. A machine 10 may be operated remotely by an operator (i.e., remote control) in either a manual or semi-autonomous manner.

In an embodiment, a first machine 11 may define a host or ego machine while the second machine 12 may define an obstacle vehicle. It will be apparent to those skilled in the art that, since an obstacle vehicle maybe moving or stopped, the collision avoidance system 36 may be used with obstacles that are moving or fixed.

Figure 2:
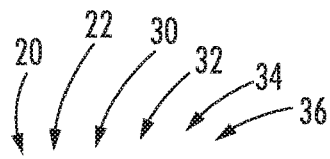
FIG. 2 depicts a schematic illustration of a machine in which the principles disclosed herein may be used.

Referring to FIG. 2, the first machine 11 includes a drive or propulsion system generally depicted at 14 operative to propel the first machine 11 about the work site. The propulsion system 14 may include a prime mover, such as an internal combustion engine generally depicted at 15, and a ground engaging drive mechanism, such as wheels 13, operatively connected to the propulsion system. Service brakes, as depicted generally at 16, may be associated with the ground engaging drive mechanism to slow and stop the first machine 11. The first machine 10 may include an operator station or cab 17.

The first machine 11 may include a control system 20, as shown generally by an arrow in FIG. 1 indicating association with the machine. The control system 20 may utilize one or more sensors that provide data and input signals representative of various operating parameters of the first machine 11 and the environment of the work site 100 at which the machine is operating. The control system 20 may include an electronic control module or controller 21 and a plurality of sensors associated with the first machine 11.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 21 such as power supply circuitry, signal conditioning circuitry, driver circuitry, and other types of circuitry.

The controller 21 may be a single controller or may include more than one controller disposed to control various functions and/or features of the first machine 11. The term "controller" is meant to be used in its broadest sense to include one or more controllers and/or microprocessors that may be associated with the first machine 11 and that may cooperate in controlling various functions and operations of the machine. The functionality of the controller 21 may be implemented in hardware and/or software without regard to the functionality. The controller 21 may rely on one or more data maps relating to the operating conditions and the operating environment of the first machine 11 and the work site 100 that may be stored in the memory of controller. Each of these data maps may include a collection of data in the form of tables, graphs, and/or equations.

The control system 20 and controller 21 may be located on the first machine 11 or may be distributed with components also located remotely from the machine such as at a command center (not shown) or on another machine. The functionality of control system 20 may be distributed so that certain functions are performed at the first machine 11 and other functions are performed remotely.

The control system 20 may include a communications system indicated generally at 22 such as a wireless network system for transmitting signals between the first machine 11 and a system located remote from the machine such as at the command center.

The communications system 22 may include components to enable each machine 10 to send and receive signals to and from other systems and machines.

In an embodiment, each communications system 22 may include a transmitter system (not shown) for transmitting signals from one communications system and a receiver system (not shown) for receiving signals from a transmitter system of another communications system. In some instances, the transmitter system and the receiver system may be combined as a transceiver system. The communications system 22 may implement any desired protocol including any of a plurality of communications standards. The desired protocols permit communication between machines and systems.

The first machine 11 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the first machine 11 and that may cooperate to sense various functions, operations, and operating characteristics of the machine and/or aspects of the environment in which the machine is operating.

A pose sensing system 30, as shown generally by an arrow in FIG. 1 indicating association with the first machine 11, may include a pose sensor 31 to sense the position and orientation (i.e., the heading, pitch, roll or tilt, and yaw) of the machine relative to the work site 100. The position and orientation of a machine are sometimes collectively referred to as the pose of the machine. The pose sensor 31 may include a plurality of individual sensors that cooperate to generate and provide pose data or signals to the controller 21 indicative of the position and orientation of the machine 10.

In one example, the pose sensor 31 may include one or more sensors that interact with a positioning system such as a global navigation satellite system or a global positioning system to operate as a pose sensor. In another example, the pose sensor 31 may further or alternatively include an inertial measurement unit and/or a slope or inclination sensor, such as pitch angle sensor, for measuring the slope or inclination of the machine 10 relative to a ground or earth reference. The controller 21 may use pose signals from the pose sensors 31 to determine the pose of the first machine 11 within work site 100. In other examples, the pose sensor 31 may include an odometer or another wheel rotation sensing sensor, a perception based system, or may use other systems such as lasers, sonar, or radar to determine all or some aspects of the pose of machine 10.

If desired, the pose sensing system 30 may include distinct position and orientation sensing systems. In other words, a position sensing system (not shown) may be provided for determining the position of the first machine 11 and a separate orientation sensing system (not shown) may be provided for determining the orientation of the machine.

The first machine 11 may also be equipped with a movement sensing system 32, as shown generally by an arrow in FIG. 1 indicating association with the first machine. The movement sensing system 32 may include a movement sensor 33 to sense the movement of the first machine 11 such as linear and angular velocity and acceleration. In an embodiment, the movement sensor 33 may be configured as a multi-axis inertial measurement unit. Other configurations of the movement sensor 33 are contemplated and would be understood by one skilled in the art. Further, the movement sensor 33 may include a plurality of individual sensors that cooperate to generate and provide movement data or signals to the controller 21 indicative of the movement (i.e., velocity and/or acceleration) of the first machine 11.

In some embodiments, the pose sensor 31 and the movement sensor 33 may be a single component or share common components and time derivatives or integrals used to determine other terms. For example, the pose of components may be determined and time derivatives used to determine velocity, acceleration, angular velocity, and/or angular acceleration. Similarly, acceleration and angular acceleration may be determined and integrated to determine the pose, velocity and/or angular velocity.

An object detection system 34 may be mounted on or associated with the first machine 11, as shown generally by an arrow in FIG. 1 indicating association with the first machine. The object detection system 34 may include a radar system, a sonar system, a lidar system, a camera vision system, and/or any other desired system together with one or more associated object detection sensors 35. Object detection sensors 35 may generate object detection data that is received by the controller 21 and used by the controller to determine the presence, pose, and movement of obstacles within the range of the sensors.

In another embodiment, the second machine 12 may include a control system 40, a controller 41, a pose sensing system 42, a movement sensing system 43, and a communications system 44, each being shown generally by an arrow in FIG. 1 indicating association with the second machine. Each of the control system 40, the controller 41, the pose sensing system 42, the movement sensing system 43, and the communications system 44 of the second machine 12 may be identical or similar to the systems described above with respect to the first machine 11. Communication of the pose and movement of the second machine 12 to the first machine 11, directly or indirectly, may operate as an object detection system 34 associated with the first machine. The pose data provided by the pose sensing system 42 and movement data provided by the movement sensing system 43 through the communications system 44 of the second machine 12 may also be considered object detection data provided by an object detection sensor.

Still further, another apparatus or system, such as a drone (not shown), traffic signals (not shown), or other stationary or movable machines (not shown), may include a pose sensing system, a movement sensing system, and a communications system which are used to monitor the pose and movement of the second machine 12 and communicate the presence, pose, and movement of the second machine to the first machine 11.

In order to reduce the likelihood of a collision between the first machine 11 and second machine 12, the first machine may include a collision avoidance system 36 as shown generally by an arrow in FIG. 1 indicating association with the first machine that works in conjunction with the propulsion system 14. The collision avoidance system 36 may utilize the elevation difference between the first and second machines 11, 12 to reduce false collision alerts or warnings and generally improve the overall accuracy of the collision avoidance system. To do so, the collision avoidance system 36 may analyze the respective poses and movements of the first machine 11 and the second machine 12, including any elevation difference between the machines.

Elevation differences between the first machine 11 and the second machine 12 may occur, for example, when the machines are operating on a hill with one machine above the other, when the machines are operating on opposite sides or slopes of a crest or a valley, or when the first or second machine 11, 12 is operating on an overpass or an underpass. When operating on a hill or opposite sides of a crest or a valley, the actual braking distance of the first machine 11 may be different from that which would be expected when operating on a flat surface. Further, when the second machine 12 is operating on an overpass or switch-back, the second machine may appear on the object detection system 34 and generate a collision alert or warning even though the collision warning may be unnecessary as a result of elevation differences between the machines.

In order for a collision to occur when there is an elevation difference between the first and second machines 11, 12, one or both of the machines must move uphill or downhill so that ultimately the two machines are at the same elevation. Even though the topography of the work surface upon which the first and second machines 11, 12 are operating is not known, some characteristics of the work site 100 may be known or assumed. As an example, the maximum rate of grade change of the grade or work surface 101 and the maximum magnitude of the slope of the grade or work surface may be known or assumed. When forming a work site or road, standards are typically followed that designate or define the maximum rate of change of the grade or work surface. Further, the standards also typically define the maximum permitted magnitude of the slope of the grade or work surface 101 so that the machines are not traveling up or down a slope that is steeper than the standard. Accordingly, the collision avoidance system 36 may be configured to use the maximum rate of grade change and the maximum permitted slope as part of the collision avoidance analysis.

The collision avoidance system 36 may be configured to use the maximum rate of grade change and the maximum slope of the grade to determine whether a collision between the first machine 11 and the second machine 12 is possible. For example, the collision avoidance system 36 may perform an analysis based upon a position of the first and second machines 11, 12 utilizing the maximum rate of grade change to determine whether the positions of the machines may change rapidly enough so that a collision is possible. Further, since the shortest path between two objects is a straight line, the collision avoidance system 36 may determine the actual slope or orientation of such a straight line and compare the actual slope or orientation to the maximum permitted slope of the work surface 101.

The controller 21 may generate propulsion commands to propel the first machine 11 along the work surface 101. If the magnitude of the slope of the work surface 101 is greater than the maximum permitted slope, the collision avoidance system 36 may determine that a collision is not possible. For example, in instances in which one of the first or second machine 11, 12 is operating on an overpass or an underpass, the collision avoidance system 36 may determine that a collision is not possible. In such case, the controller 21 may not generate a collision alert and generate continuing propulsion commands to continue to propel the first machine 11 along the work surface 101. If a collision is possible, the controller 21 may generate a collision alert or command. The collision alert may include an audible and/or visual warning (if an operator is present) to slow or stop the machine to avoid a collision. In addition or in the alternative, the collision alert may include a braking command to slow or stop the machine to avoid a collision. The controller 21 may utilize the actual pitch or slope on which the first machine 11 is operating to make a more accurate determination of the distance required to stop the first machine and avoid a collision and generate the braking command based upon such determination.

Figure 3:
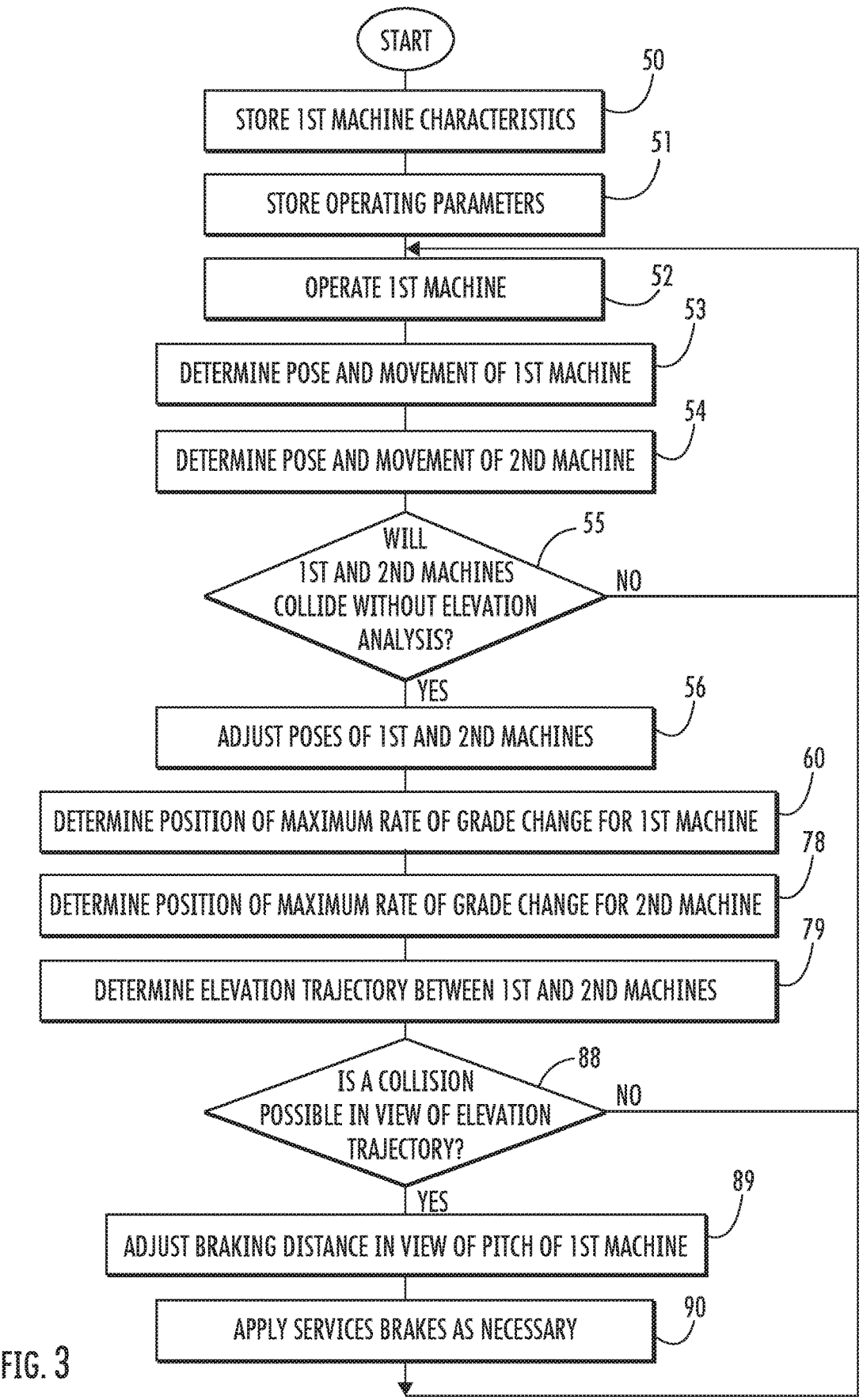
FIG. 3 depicts a flowchart of the operation of the propulsion and collision avoidance system disclosed herein.

Referring to FIG. 3, a flowchart illustrating the operation of the propulsion system 14 and the collision avoidance system 36 is depicted. At stage 50, the characteristics of the first machine 11 may be stored within or accessed by the controller 21. The machine characteristics may include, for example, the braking characteristics and the dimensions of the machine. The braking characteristics may include the distance required to stop the first machine 11 at various speeds. In some instances, the braking characteristics may also include the braking distances based upon or as modified by the angle of inclination or slope upon which the first machine 11 is operating. The dimensions of the first machine 11 may include, for example, the location of a reference point 18 on the machine such as equidistant between the front and rear wheels 13. In some instances, the reference point 18 may be above the work surface 101 on which the first machine 11 is operating.

Operating parameters of the collision avoidance system 36 may be stored within or accessed by the controller 21 at stage 51. The operating parameters may include, for example, the maximum rate of grade change of the work surface 101 together with the maximum permitted slope of the work surface. In other words, the system may store or access the maximum permitted grade change and slope along which the first machine 11 and the second machine 12 may travel. The collision avoidance system 36 may also store or access when and how to apply the service brakes 16. Still further, the collision avoidance system 36 may be configured to operate as a constant velocity and/or constant acceleration system. In such case, the velocity and/or acceleration of the first and second machines 11, 12 are assumed to be constant for purposes of the collision avoidance analysis.

The first machine 11 may be operated at stage 52. At stage 53, the controller 21 may determine the pose of the first machine 11 such as by receiving pose data from the pose sensor 31 and determine movement of the first machine such as by receiving movement data from the movement sensor 33. The controller 21 may determine at stage 54 the pose and movement of the second machine 12 based upon object detection data received from the object detection sensor 35.

At decision stage 55, the controller 21 may determine whether the first and second machines 11, 12 would collide if they were operating at the same elevation. In other words, the controller 21 may perform a horizontal analysis ignoring whether any elevation differences exist between the first and second machines 11, 12. If the first and second machines 11, 12 are traveling along the same path towards each other, the controller 21 may determine whether the machines will collide within a designated time period. Such a designated time period may be equal to the time required to stop the first machine 11 to avoid a collision plus a designated factor of safety. If the first and second machines 11, 12 are traveling along different but intersecting paths, the controller 21 may determine whether the two machines will be at the intersection of the two paths at the same time in view of a designated factor of safety. Other manners of performing a horizontal collision analysis may be used as would be understood by one skilled in the art.

If the first and second machines 11, 12 would not collide if they were at the same elevation, the first machine may continue to be operated and stages 52-55 repeated. If the two machines 11, 12 may collide if they were at the same elevation, the collision avoidance system 36 may perform an elevation analysis as described at stages 56-79 below.

At stage 56, the controller 21 may adjust the pose of the first machines 11 in view of potential errors in and tolerances of the pose sensor 31 and adjust the pose of the second machine 12 in view of potential errors in and tolerances of the object detection sensor 35. In doing so, the controller 21 may adjust the poses of the first and second machines 11, 12 so that the subsequent analyses performed by the collision avoidance system 36 are performed with a higher likelihood of a collision between the two machines. In other words, in order to increase the safety of the operation of the first machine 11, the controller 21 is configured to determine, and the collision avoidance system 36 is configured to analyze, the possible poses of the two machines that are most likely to result in a collision.

Figure 4:
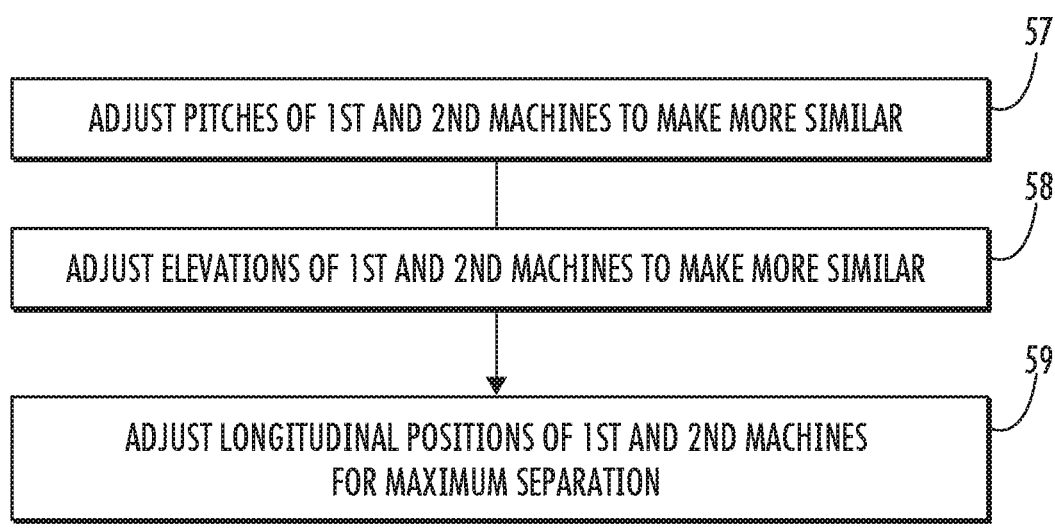
FIG. 4 depicts an additional flowchart of aspects of the operation of the propulsion and collision avoidance system disclosed herein.

Referring to the flowchart of FIG. 4, stage 56 may be separated into stages 57-59. At stage 57, the controller 21 may adjust the pitches of the first and second machines 11, 12 to make them more similar. The more similar the pitches of the first and second machines 11, 12, the more likely the machines will collide. As an example of such an adjustment, if the pose sensor 31 specifies that the first machine 11 is at a first angle with a range of tolerances and the object detection sensor 35 specifies that the second machine 12 is at a second angle with a range of tolerances, the controller 21 may adjust their respective pitches within the ranges of tolerances to make the pitches more closely match.

The controller 21 may adjust at stage 58 the elevations of the first and second machines 11, 12 to make them more similar. As an example of such an adjustment, if the pose sensor 31 specifies that the first machine 11 is at a first elevation with a range of tolerances and the object detection sensor 35 specifies that the second machine 12 is at a second elevation with a range of tolerances, the controller 21 may adjust their respective elevations within the ranges of tolerances to make the elevations more closely match.

The controller 21 may adjust at stage 59 the longitudinal positions of the first and second machines 11, 12 to provide for the maximum separation between the machines. As an example of such an adjustment, if the pose sensor 31 specifies that the first machine 11 is at a first longitudinal position with a range of tolerances and the object detection sensor 35 specifies that the second machine 12 is at a second longitudinal position with a range of tolerances, the controller 21 may adjust their respective longitudinal positions within the ranges of tolerances to make the longitudinal positions as far apart as possible.

Referring back to FIG. 3, at stage 60, the controller 21 may determine the position of the curve representing the maximum rate of change of the grade for the first machine 11. While the radius of the maximum rate of grade change curve may have been stored or accessed at stage 51, the orientation (i.e., whether the curve extends or faces upward or downward) and the center of the curve relative to the first machine 11 is unknown. In other words, the location of the center of curvature of the maximum rate of grade change curve as well as whether the center of curvature is above or below the first machine 11 is unknown. Accordingly, at stage 60 the controller 21 may determine the orientation of the maximum rate of grade change curve relative to the first machine 11 as well as the position of the maximum rate of grade change curve relative to the machine.

To simplify the description and depict the analysis pictorially herein rather than mathematically, the curves representing the maximum rate of grade change are referenced herein and depicted in the drawings as circles with each circle either above or below the elevation of the machine to represent a transition to an uphill or downhill path to the other machine or obstacle. For clarity, if the curve is above the elevation of the machine, the center of curvature is above the machine. Similarly, if the curve is below the elevation of the machine, the center of curvature is below the machine.

Figure 5:
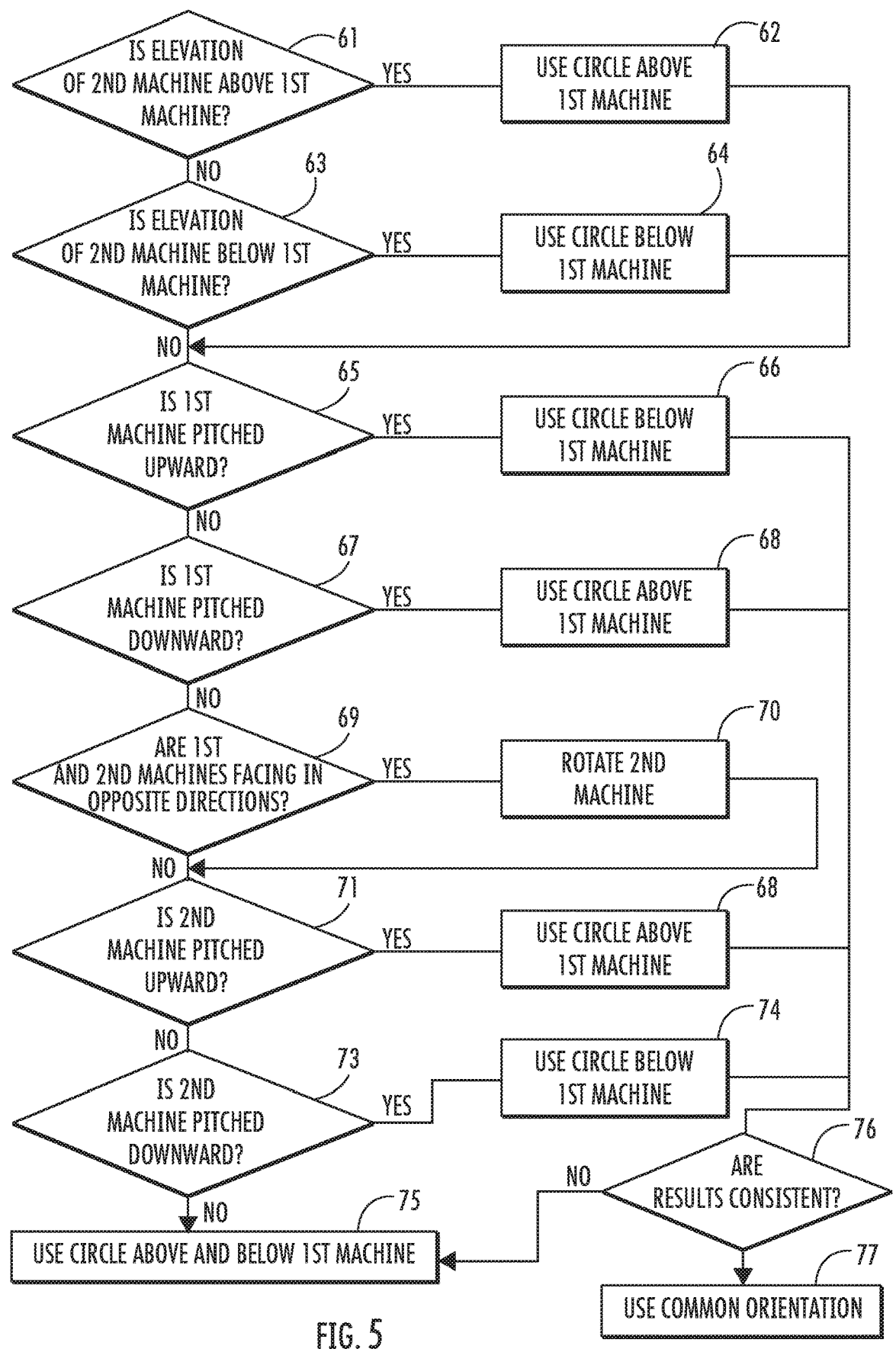
FIG. 5 depicts another flowchart of aspects of the operation of the propulsion and collision avoidance system disclosed herein.

The orientation of the curve may be determined at stages 61-74 depicted in the flowchart of FIG. 5 while the position of the curve relative to the first machine 11 may be determined as described in further detail below. The flowchart of FIG. 5 depicts two processes (stages 61-64 and stages 65-74) that are used to determine the orientation of the maximum rate of change of the grade. If the processes of stages 61-64 and stages 65-74 yield identical results, the collision avoidance analysis is performed using the single common orientation of the curve. If, however, the processes of stages 61-64 and stages 65-74 yield opposite results, either orientation of the curve may be correct and, as described in more detail below, the analysis is performed using both orientations to reduce the likelihood of a collision.

At decision stage 61, the controller 21 may determine whether the elevation of the second machine (without adjusting the pose at stage 56) is above the elevation of the first machine 11 (without adjusting the pose at stage 56). If the elevation of the second machine 12 is above the elevation of the first machine 11, the maximum rate of change of the grade for the first machine transitions to an uphill path. In such case, the circle is disposed above the first machine 11 at stage 62. As an example, a circle 110 is depicted above the second machine 12 in FIG. 1.

At decision stage 63, the controller 21 may determine whether the elevation of the second machine (without adjusting the pose at stage 56) is below the elevation of the first machine 11 (without adjusting the pose at stage 56). If the elevation of the second machine 12 is below the elevation of the first machine 11, the maximum rate of change of the grade for the first machine 11 transitions to a downhill path. The circle 111 is thus disposed below the first machine 11 at stage 64. As an example, a circle 111 is depicted below the first machine 11 in FIG. 1.

If the elevation of the second machine 12 is not above the elevation of the first machine 11 at decision stage 61 and the elevation of the second machine is not below the elevation of the first machine at decision stage 63, the first and second machines 11, 12 are at the same elevation and the orientation of the maximum rate of grade change of the first machine 11 may not be determined from the elevation difference of the machines.

In the second process of FIG. 5, the orientation of the maximum rate of grade change of the first machine 11 is dependent upon the pitch of the first machine and, in some instances, the pitch of the second machine 12. The controller 21 may determine at decision stage 65 whether the first machine 11 is pitched upward. If the first machine 11 is pitched upward, the maximum rate of grade change of for the first machine 11 transitions to a downhill path regardless of the orientation of the second machine 12. The circle is thus disposed below the first machine 11 at stage 66 as depicted at 111 in FIG. 1.

The controller 21 may determine at decision stage 67 whether the first machine 11 is pitched downward. If the first machine 11 is pitched downward, the maximum rate of grade change for the first machine 11 transitions to an uphill path regardless of the orientation of the second machine 12. The circle is thus disposed above the first machine 11 at stage 68 as depicted.

Figure 6:
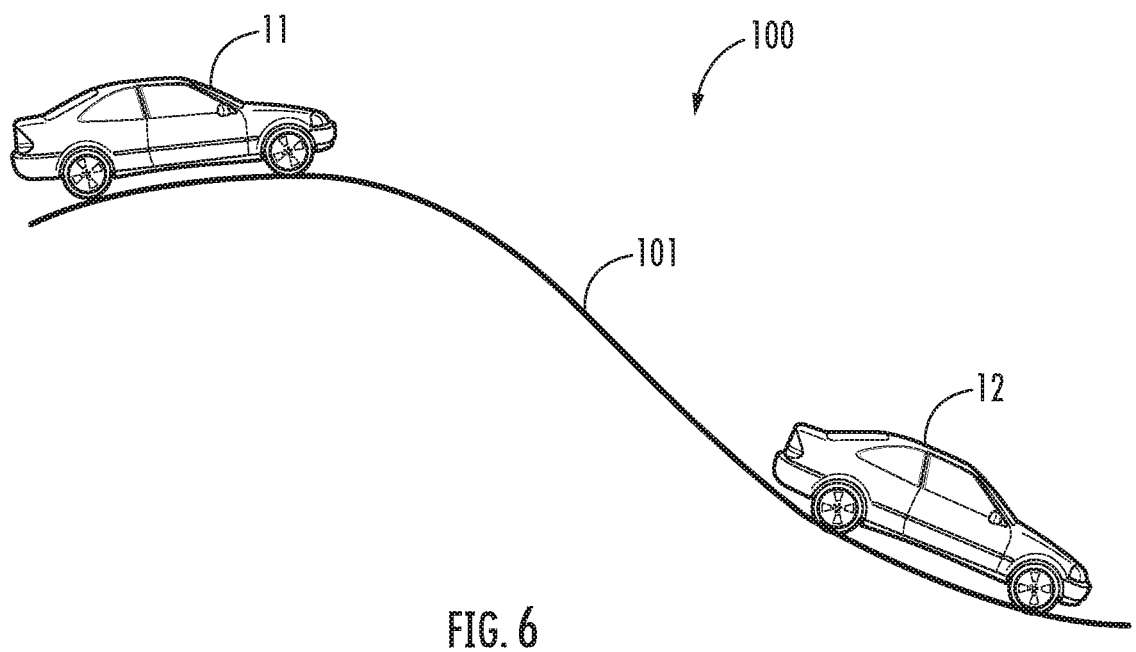
FIG. 6 depicts view similar to FIG. 1 but with one of the machines rotated by 180°.

If the first machine 11 is neither pitched upward at decision stage 65 nor pitched downward at decision stage 67, the first machine is pitched or oriented flat. In such case, the orientation of the maximum rate of change of the grade of the first machine 11 depends upon the pitch of the second machine 12. As an initial step, the controller 21 may determine at decision stage 69 whether the first and second machines 11, 12 are facing (or traveling) in opposite directions as depicted in FIG. 1. If the first and second machines 11, 12 are facing in opposite directions, the second machine 12 may be rotated 180° along its path at stage 70 so that the first and second machines 11, 12 are facing in the same direction as depicted in FIG. 6.

At decision stage 71, the controller 21 may determine whether the second machine 12 is pitched upward. If the second machine is pitched upward, the maximum rate of change of the grade for the first machine 11 transitions to an uphill path regardless of the orientation of the second machine 12. The circle is thus disposed above the first machine 11 at stage 72 as depicted at 110.

At decision stage 73, the controller 21 may determine whether the second machine 12 is pitched downward. If the second machine 12 is pitched downward, the maximum rate of change of the grade for the first machine 11 transitions to a downhill path regardless of the orientation of the second machine 12. The circle is thus disposed below the first machine 11 at stage 74 as depicted at 111 in FIG. 1.

If the second machine 12 is neither pitched upward at decision stage 71 nor pitched downward at decision stage 73, the second machine is pitched or oriented flat. In such case, the orientation of the maximum rate of change of the grade for the first machine 11 may transition at stage 75 either to an uphill path as depicted in FIG. 1 with the circle 110 above the second machine 12 or a downhill path as depicted in FIG. 1 with the circle 111 below the first machine. In such case, the controller 21 may perform the analyses described below for both potential orientations of the maximum rate of grade change.

At decision stage 76, the controller 21 may determine whether the results from stages 61-64 and stages 65-74 yield identical or consistent results (i.e., only circle above or circle below). If the results are consistent, the subsequent collision avoidance analysis is performed using the single common orientation of the curve as set forth at stage 77. If, however, the processes of stages 61-64 and stages 65-74 yield opposite results, either orientation of the curve may be correct and, as described in more detail below, the collision avoidance analysis is performed using both orientations to reduce the likelihood of a collision as set forth at stage 75.

It should be noted that the rotation of the second machine 12 at stage 70 is only for purposes of determining the orientation of the maximum rate of change of the grade for the first machine 11 at stages 71-77 and not for any further analysis. In an alternate embodiment, stages 69-70 may be deleted and the analyses of stages 71-74 duplicated and reversed in instances in which the first and second machines 11, 12 are facing in opposite directions.

After determining the orientation, the controller 21 may determine the position of the curve representing the maximum rate of grade change of the first machine 11 relative to the first machine. In doing so, the controller 21 may determine the center of the circle representing the maximum rate of grade change for the first machine 11. If the orientation of the maximum rate of change of the grade for the first machine 11 transitions to an uphill path (i.e., the circle is above the first machine as depicted at 110 in FIG. 1), the center of the first machine may be represented at the following x, y locations:

$$x_{circle} = x_{obstacle} - r \sin \theta \qquad \text{Equation (1)}$$

$$y_{circle} = y_{obstacle} + r \cos \theta \qquad \text{Equation (2)}$$

where $x_{circle}$ is the position of the center of the circle 110 along the x- or horizontal axis, $x_{obstacle}$ is the position of the reference point 18 of the first machine along the x-axis, $y_{circle}$ is the position of the center of the circle 110 along the y-axis, $y_{obstacle}$ is the position of the reference point 18 of the first machine along the y- or elevation axis, r is the radius of the circle representing the maximum rate of change of the grade for the first machine, and $\theta$ is the angle or pitch of the first machine relative to the x-axis.

If the orientation of the maximum rate of grade change for the first machine 11 transitions to a downhill path (i.e., the circle 111 is below the first machine as depicted in FIG. 1), the center of the first machine may be represented at the following x, y location:

$$x_{circle} = x_{obstacle} + r \sin \theta \qquad \text{Equation (3)}$$

$$y_{circle} = y_{obstacle} - r \cos \theta \qquad \text{Equation (4)}$$

Referring back to FIG. 3, at stage 78 the controller 21 may determine the position of the curve representing the maximum rate of change of the grade for the second machine 12. To do so the processes of stages 61-77 and Equations (1)-(4) may be repeated with, in each instance, the first and second machines 11, 12 reversed. In other words, processes of stages 61-77 and Equations (1)-(4) may be repeated as if the second machine defines the host or ego vehicle and the first machine defining the obstacle vehicle.

At stage 79, the controller 21 may determine the shortest path between the curve representing the maximum rate of grade change for the first machine 11 and the curve representing the maximum rate of grade change of grade for the second machine 12. Since the shortest path between the first and second machines 11, 12 is a straight line, the controller 21 may be configured to determine the position of a line tangent to both of the maximum rate of grade change curves. The tangent line may be determined in any desired manner.

Figure 7:
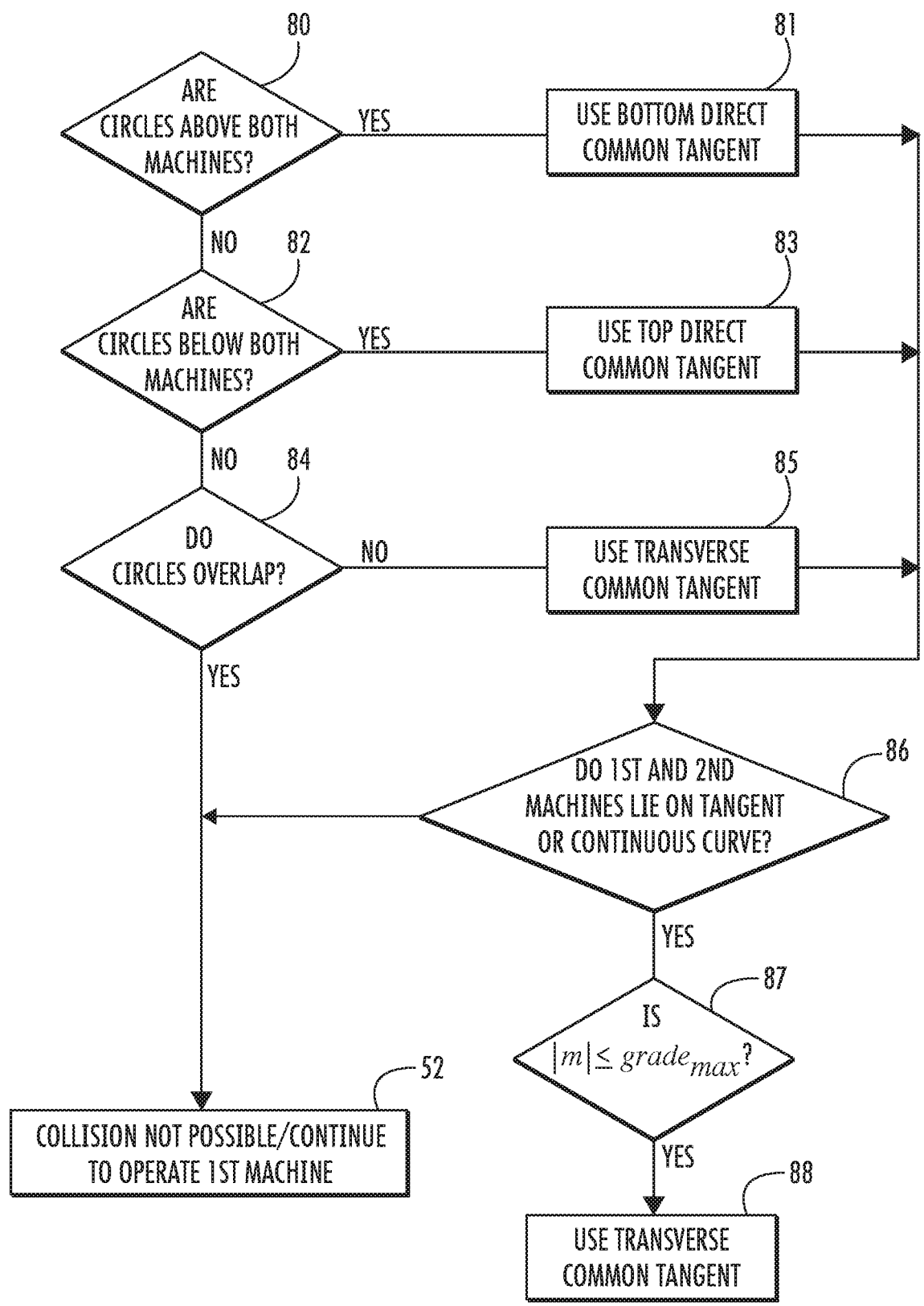
FIG. 7 depicts still another flowchart of aspects of the operation of the propulsion and collision avoidance system disclosed herein.

Referring to FIG. 7, stage 79 may be separated into stages 80-88 that identify different manners of determining the tangent line. As an initial matter, the different manners of determining the tangent line rely upon the location of the circles 110, 111 above and below the first and second machines 11, 12. Inasmuch as the circles 110, 111 may be both above and below the machines in some instances as set forth at stage 75, the process of stages 80-88 set forth below may be performed for each alternative configuration when the circles are both above and below the machines. The collision avoidance system 36 may be configured to use the alternative that provides the safest result. In other words, if one configuration indicates that a collision is not possible and a second configuration indicates that a collision is possible, the collision avoidance system 36 may be configured to discard the non-collision solution and operate based upon the collision solution.

At decision stage 80, the controller 21 may determine whether the grade change curves or circles determined at stages 60, 78 are both above the first and second machines 11, 12. If both of the grade change curves or circles are above the first and second machines 11, 12, the tangent line may be determined using a bottom direct common tangent of the two curves as set forth at stage 81.

At decision stage 82, the controller 21 may determine whether the grade change curves or circles determined at stages 60, 78 are both below the first and second machines 11, 12. If both of the grade change curves or circles are below the first and second machines 11, 12, the tangent line may be determined using a top direct common tangent of the two curves as set forth at stage 83.

If the curves or circles are not both above or below the first and second machines 11, 12, the controller 21 may determine at decision stage 84 whether the circles are overlapping. If the circles of the first and second machines 11, 12 are not overlapping, the controller 21 may determine the tangent line at a location from the top of the circle above one machine to the bottom of a circle below the other machine as set forth at stage 85. An example of such a transverse angled tangent line is depicted at 112 in FIG. 1. If the circles do overlap at decision stage 84, a collision between the first and second machines 11, 12 is not possible and the first machine may continue to be operated at stage 52.

At decision stage 86, the controller 21 may determine whether both of the first and second machines 11, 12 lie along the tangent line or along the portions of the curves or circles that continue the tangent line. In other words, the controller 21 may determine whether either or both the first and second machines 11, 12 could travel continuously from its curve or circle onto the tangent line without an abrupt change in direction. If either machine does not lie along the tangent line or along the portions of the curves or circles that continue the tangent line, a collision between the first and second machines 11, 12 is not possible and the first machine may continue to be operated at stage 52.

If both machine lie along the tangent line or along the portions of the curves or circles that continue the tangent line, the controller may determine at decision stage 87 whether the magnitude or absolute value of the slope |m| of the tangent line is less than or equal to the maximum slope $grade_{max}$ along which the first and second machines 11, 12 may travel. If the absolute value of the slope of the tangent line is not less than or equal to the maximum slope along which the first and second machines 11, 12 may travel, a collision between the first and second machines 11, 12 is not possible and the first machine may continue to be operated at stage 62.

If the absolute value of the slope |m| of the tangent line is less than or equal to the maximum slope $grade_{max}$ along which the first and second machines 11, 12 may travel, a collision between the first and second machines 11, 12 is possible as set forth at stage 88. Referring back to FIG. 3, at stage 89, the controller 21 may adjust the braking distance of the first machine 11 in view of the slope or pitch on which the first machine is operating. The controller 21 may generate at stage 90 appropriate braking commands to stop or slow the first machine 11 in order to avoid a collision.

In other words, even if the controller 21 determines at stage 55 that based upon a horizontal analysis a collision may occur, the collision avoidance system 36 is operative to further analyze the poses of the first and second machines 11, 12, including the elevation differences, to determine whether a collision will occur. If a collision will not occur in view of the poses of the machines, the collision avoidance system 36 may ignore the horizontal collision analysis and the propulsion system 14 may continue to propel the first machine 11.

Figure 8:
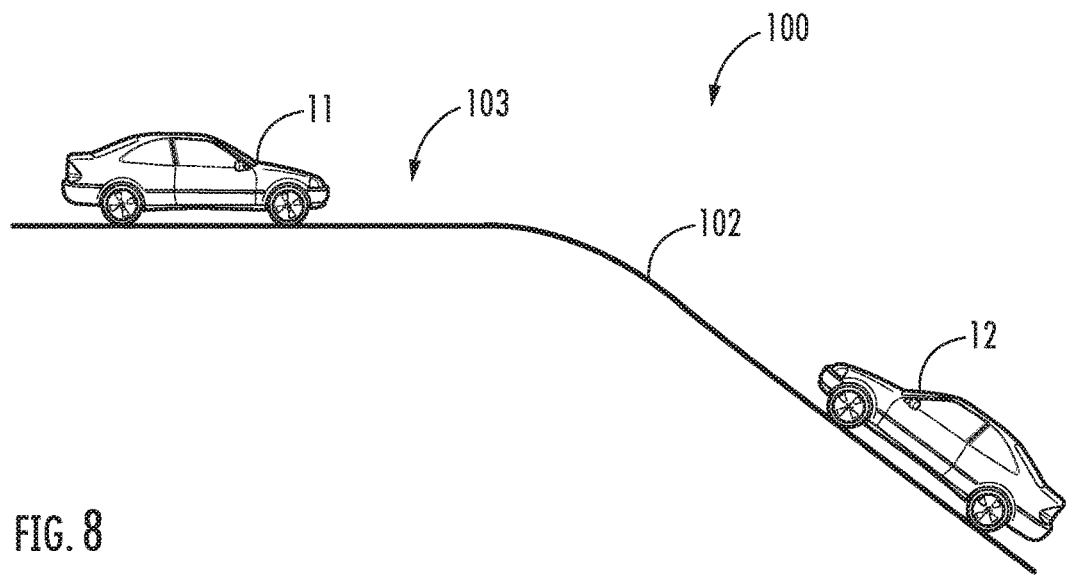
FIG. 8-12 depict a sequence of a first example of the operation of the collision avoidance system disclosed herein.
Figure 9:
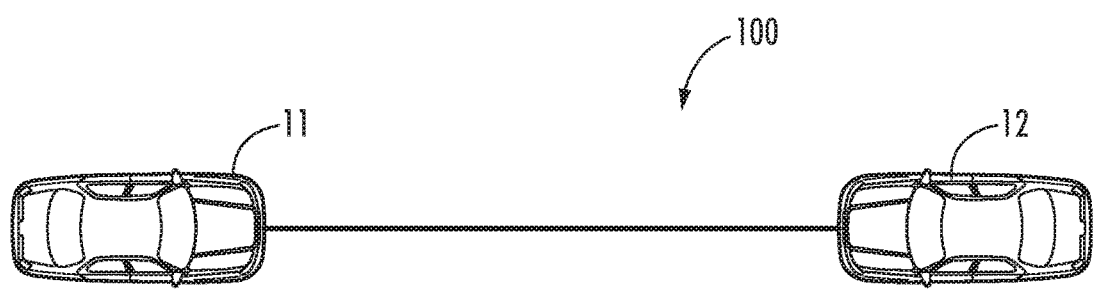
Figure 10:
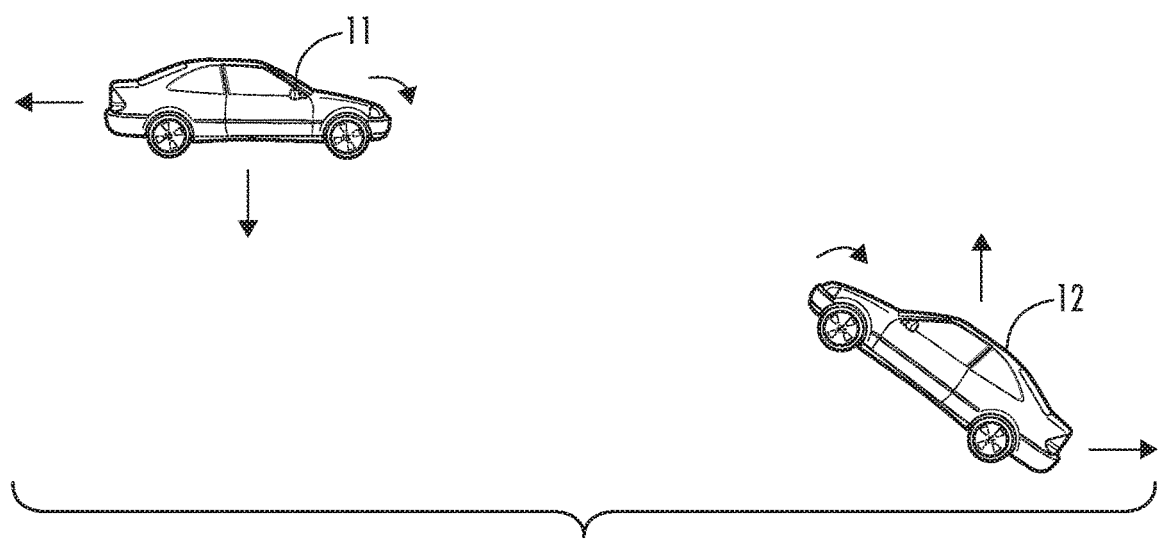

Referring to FIGS. 8-12, a first example of the operation of the collision avoidance system 36 is depicted. In FIG. 8, the first machine 11 is depicted at a flat surface at the top of a hill 103 and the second machine 12 is depicted on a sloped surface of the hill. In FIG. 9, the collision avoidance system 36 performs a general analysis based upon the horizontal positions of the first and second machines 11, 12 (i.e., ignoring elevation) to determine whether a collision between the two machines is possible. In FIG. 10, the poses of the first and second machines 11, 12 are adjusted within the tolerances of the pose accuracy to increase the likelihood of a collision in order to improve the safety of the collision avoidance system 36.

Figure 11:
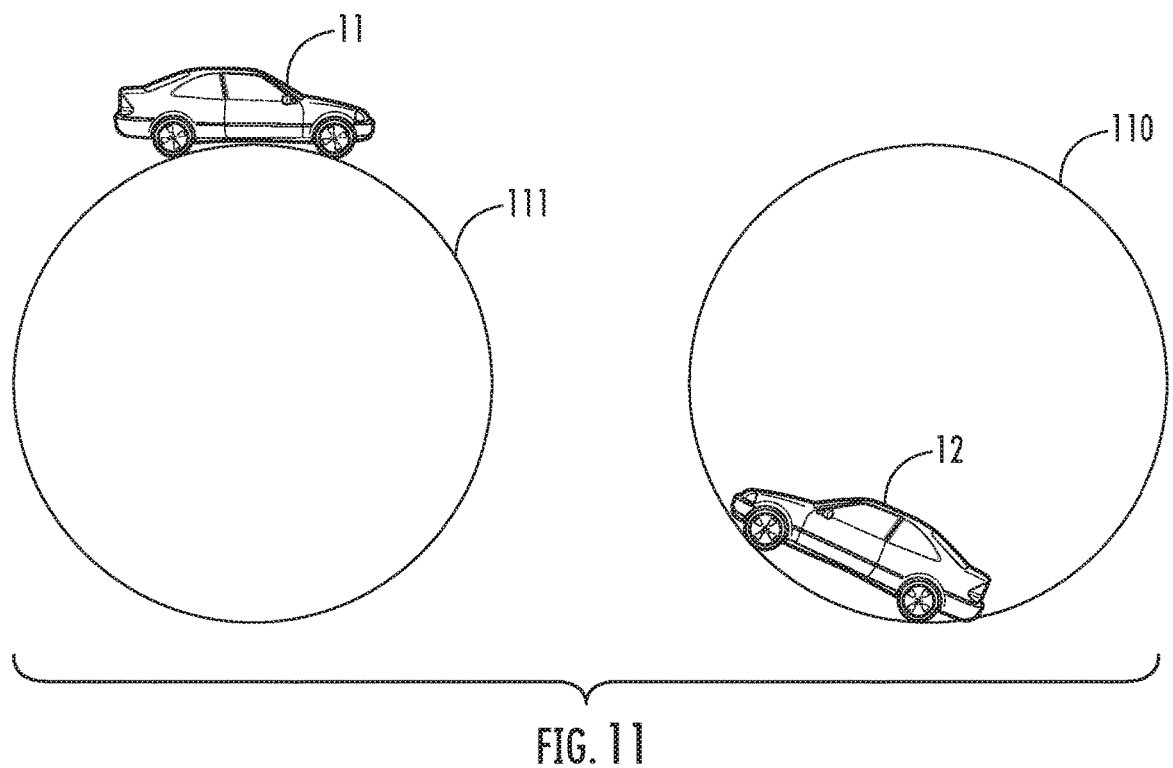
Figure 12:
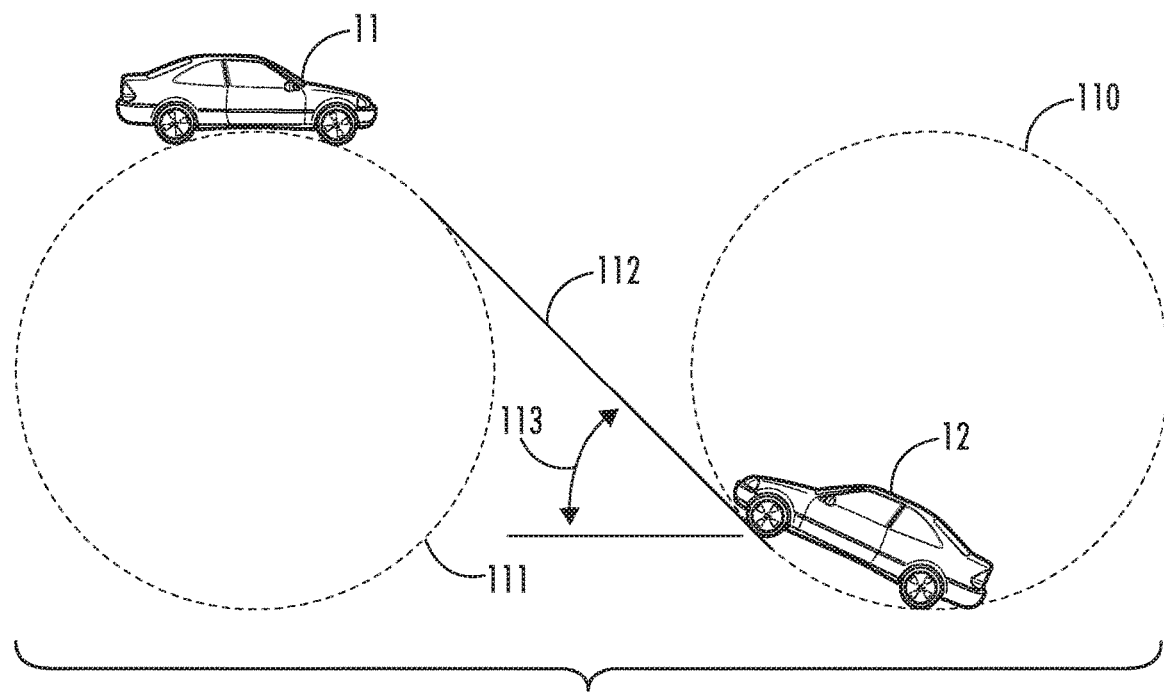

In FIG. 11, a circle 111 is positioned beneath the first machine 11 based upon the poses of the first and second machines 11, 12. A circle 110 is positioned above the second machine 12 based upon the poses of the first and second machines 11, 12. In FIG. 12, a transverse common tangent line 112 is depicted that extends from a portion near the top of the circle 111 positioned beneath the first machine 11 and towards the bottom of the circle 110 positioned above the second machine 12.

If the angle 113 of the tangent line 112 relative to horizontal is greater than the maximum permitted slope or grade of the work surface 101, a collision between the two machines will not occur because the work surface 101 extending between the two machines must have a slope less than the tangent line. However, if the angle 113 of the tangent line 112 relative to horizontal is less than or equal to the maximum permitted slope or grade, a collision between the two machines may occur and the collision avoidance system 36 may operate by including the effects of gravity on the braking distance of the first machine.

Figure 13:
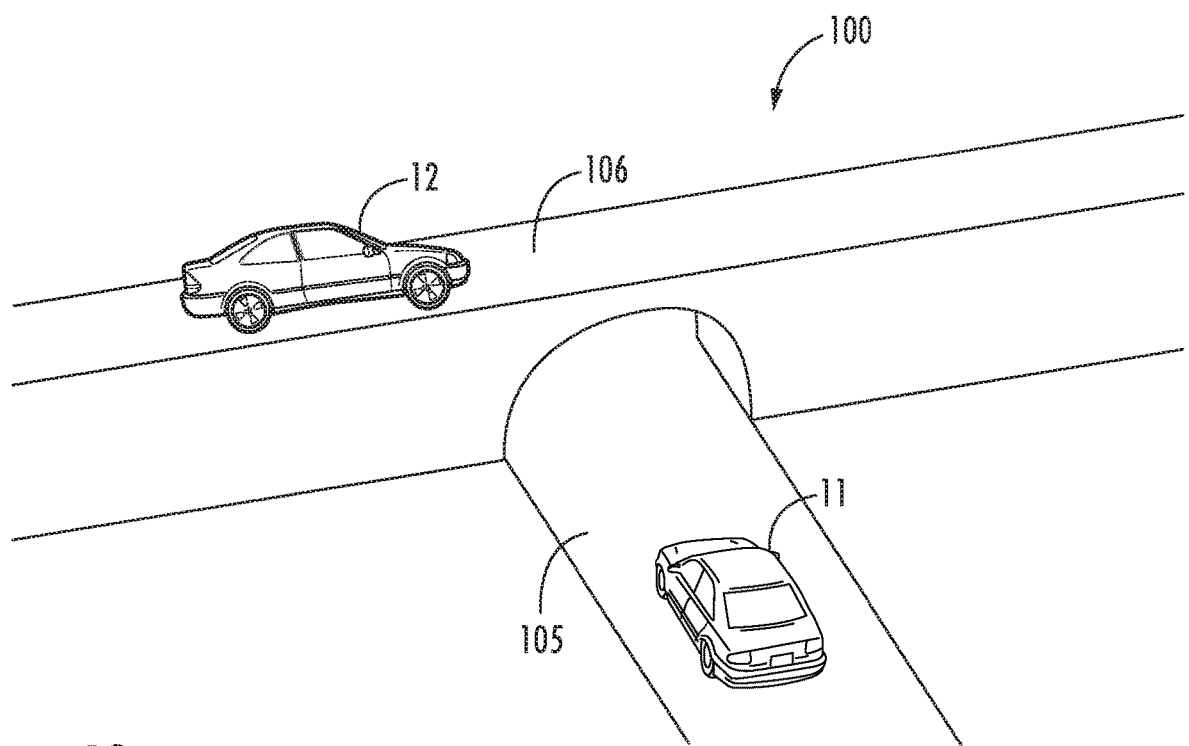
FIG. 13-17 depict a sequence of a second example of the operation of the collision avoidance system disclosed herein.
Figure 14:
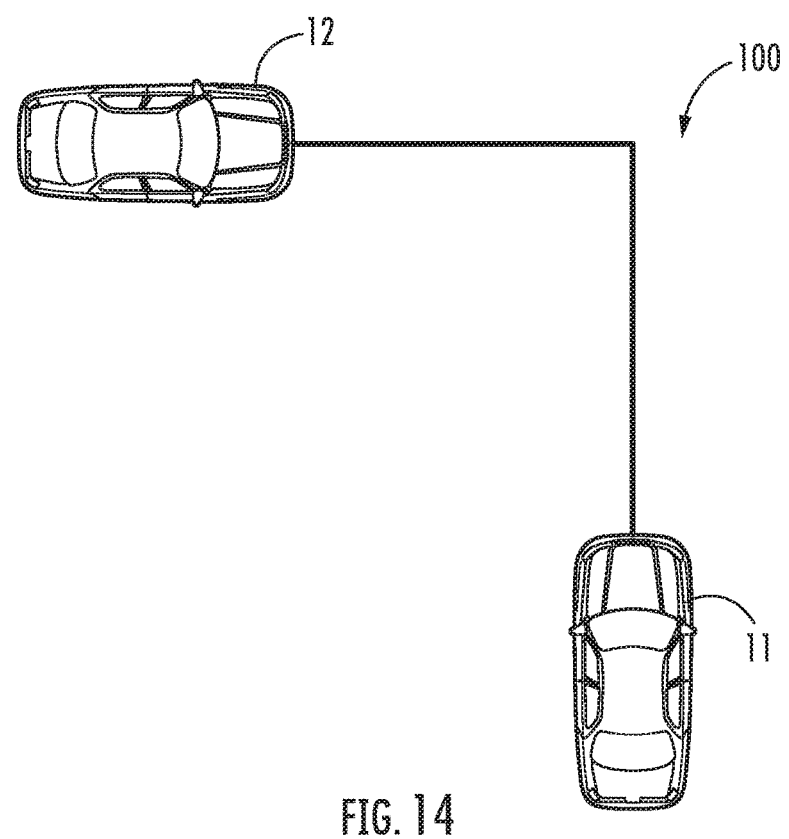
Figure 15:
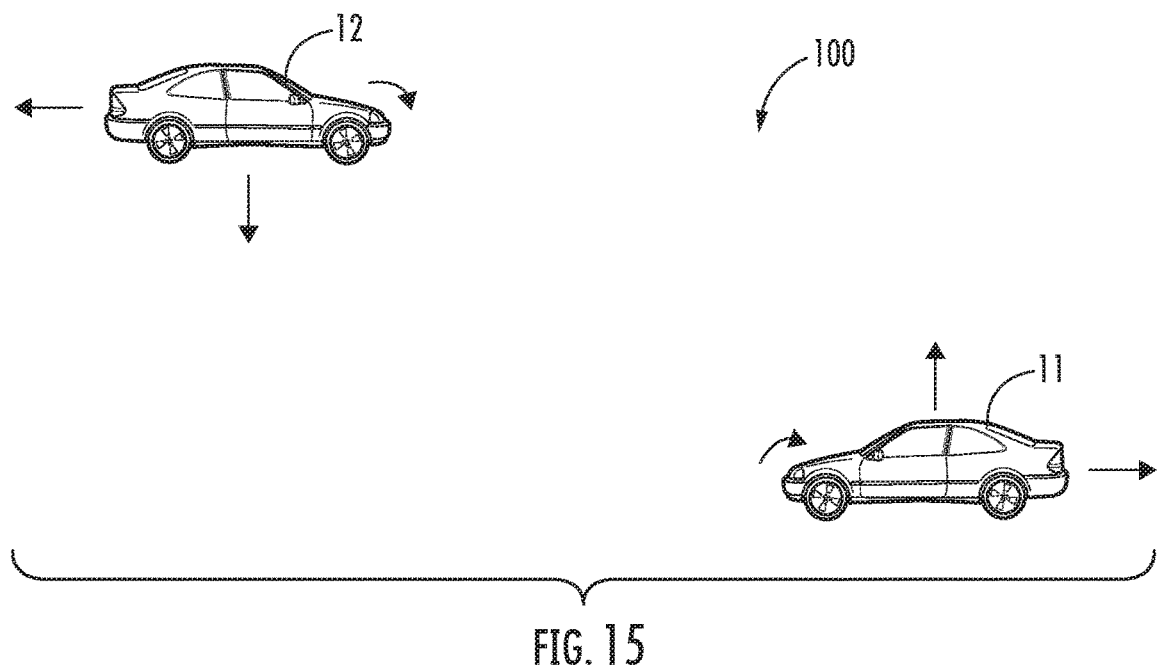

Referring to FIGS. 13-17, a second example of the operation of the collision avoidance system 36 is depicted. In FIG. 13, the first machine is depicted is operating on a first work surface 105 while the second machine 12 is operating on a second work surface 106 that travels over the first work surface as part of a bridge or overpass. In FIG. 14, the collision avoidance system 36 performs a general analysis based upon the horizontal positions of the first and second machines 11, 12 (i.e., ignoring elevation) to determine whether a collision between the two machines is possible. In FIG. 15, the poses of the first and second machines 11, 12 are adjusted within the tolerances of the pose accuracy to increase the likelihood of a collision in order to improve the safety of the collision avoidance system 36.

Figure 16:
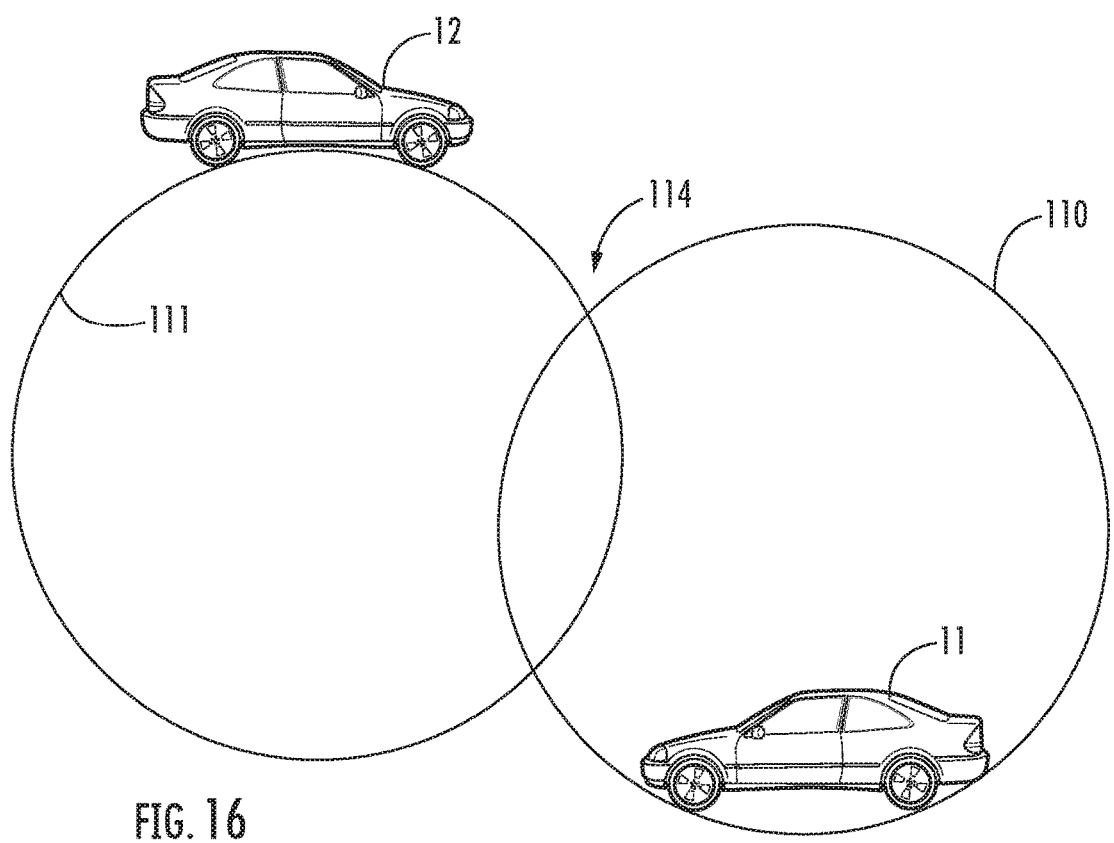

In FIG. 16, a circle 110 is positioned above the first machine 11 based upon the poses of the first and second machines 11, 12. A circle 111 is positioned below the second machine 12 based upon the poses of the first and second machines 11, 12. The circles 110, 111 associated with the second and first machines 11, 12, respectively, can be seen to overlap at 114.

Figure 17:
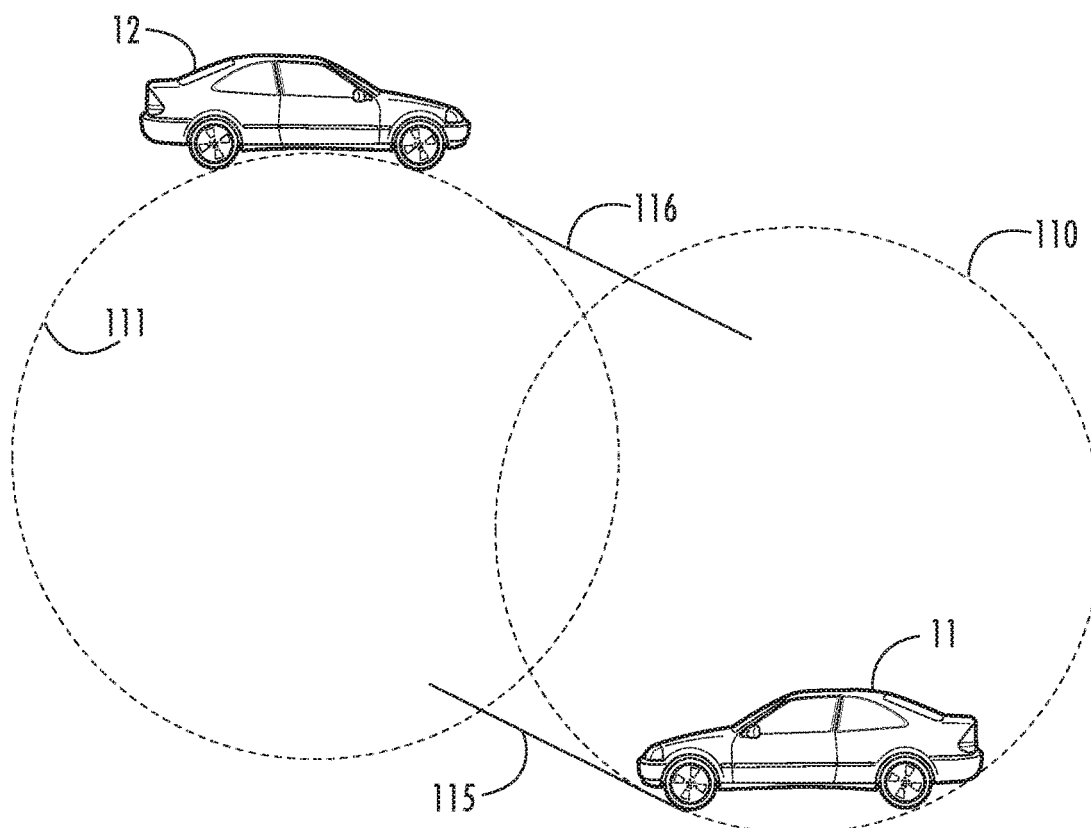

As depicted in FIG. 17, a first tangent line 115 may be drawn with respect to the circle 110 and a second tangent line 116 may be drawn with respect to the circle 111 but such tangent lines cannot be drawn to intersect both circles in a common manner. In other words, a common tangent line may not to be drawn between the circles 110, 111. Since a common tangent line may not be drawn between the circles, the collision avoidance system 36 will not generate a collision alert or warning and thus the first machine 11 may continue to operate.

Comparing FIGS. 11 and 16, it may appear that the collision avoidance system 36 may generate a collision alert or warning for the example of FIGS. 13-17 when the first and second machines 11, 12 are farther apart such as is depicted in FIG. 11. However, by performing the initial horizontal analysis, the collision avoidance system 36 may determine that the two machines are too far apart for a collision to occur. Once the first and second machines 11, 12 are close enough together to possibly generate a collision alert based upon the horizontal analysis of the collision avoidance system 36, the collision avoidance system may be configured to determine based on the elevation analysis that a collision is not possible.

Figure 18:
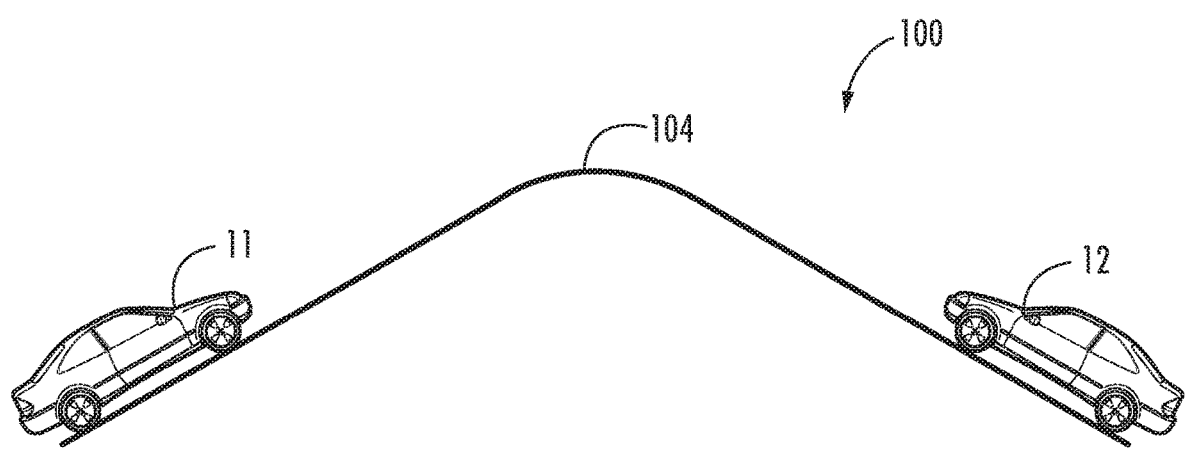
FIG. 18-22 depict a sequence of a second example of the operation of the collision avoidance system disclosed herein.
Figure 19:
Figure 20:
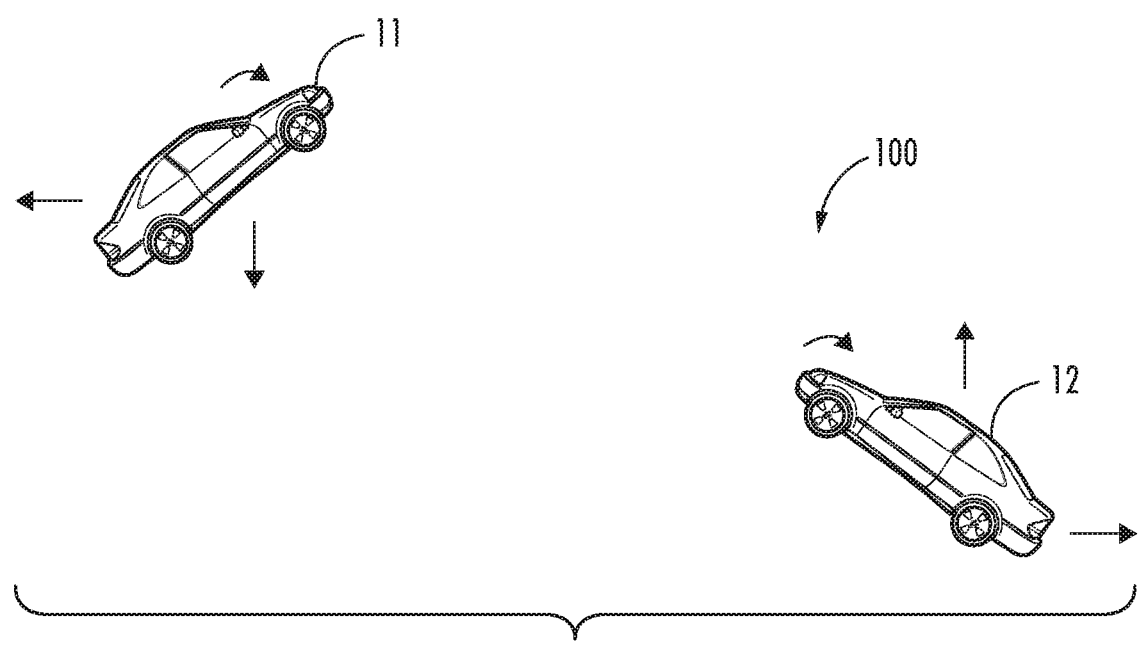

Referring to FIGS. 18-22, a third example of the operation of the collision avoidance system 36 is depicted. In FIG. 18, the first and second machines 11, 12 are depicted on opposite sides of a crest 104 of a hill. In FIG. 19, the collision avoidance system 36 performs a general analysis based upon the horizontal positions of the first and second machines 11, 12 (i.e., ignoring elevation) to determine whether a collision between the two machines is possible. In FIG. 20, the poses of the first and second machines 11, 12 are adjusted within the tolerances of the pose accuracy to increase the likelihood of a collision in order to improve the safety of the collision avoidance system 36.

Figure 21:
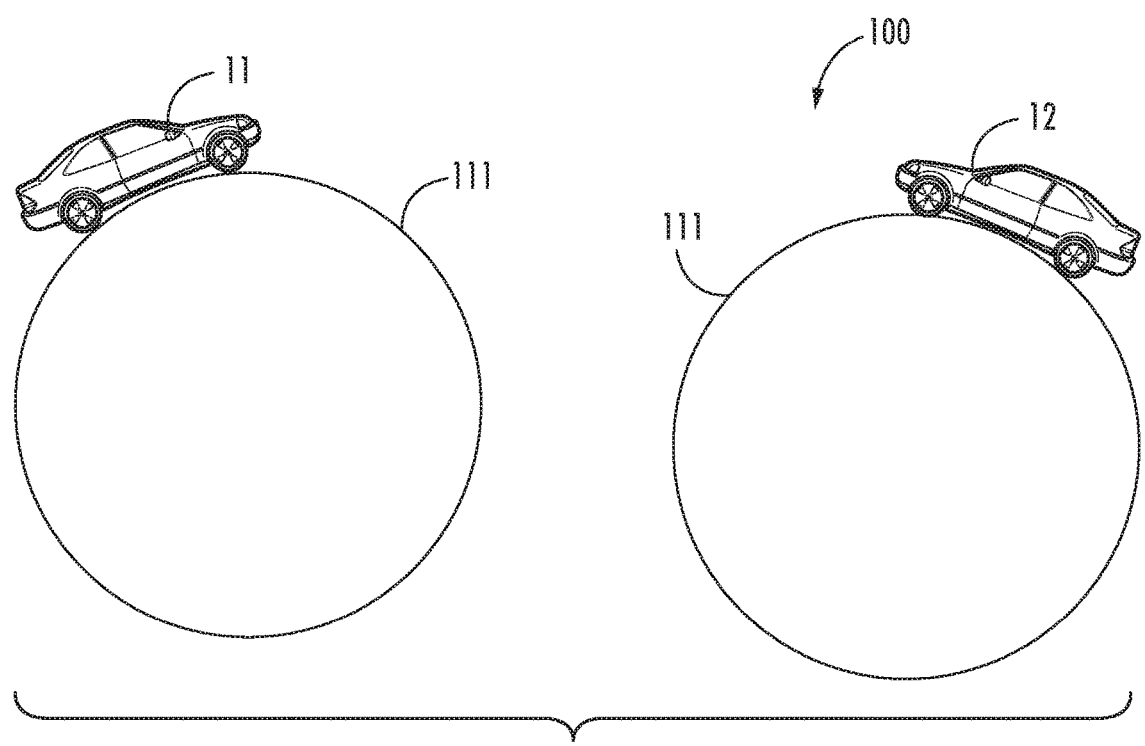
Figure 22:
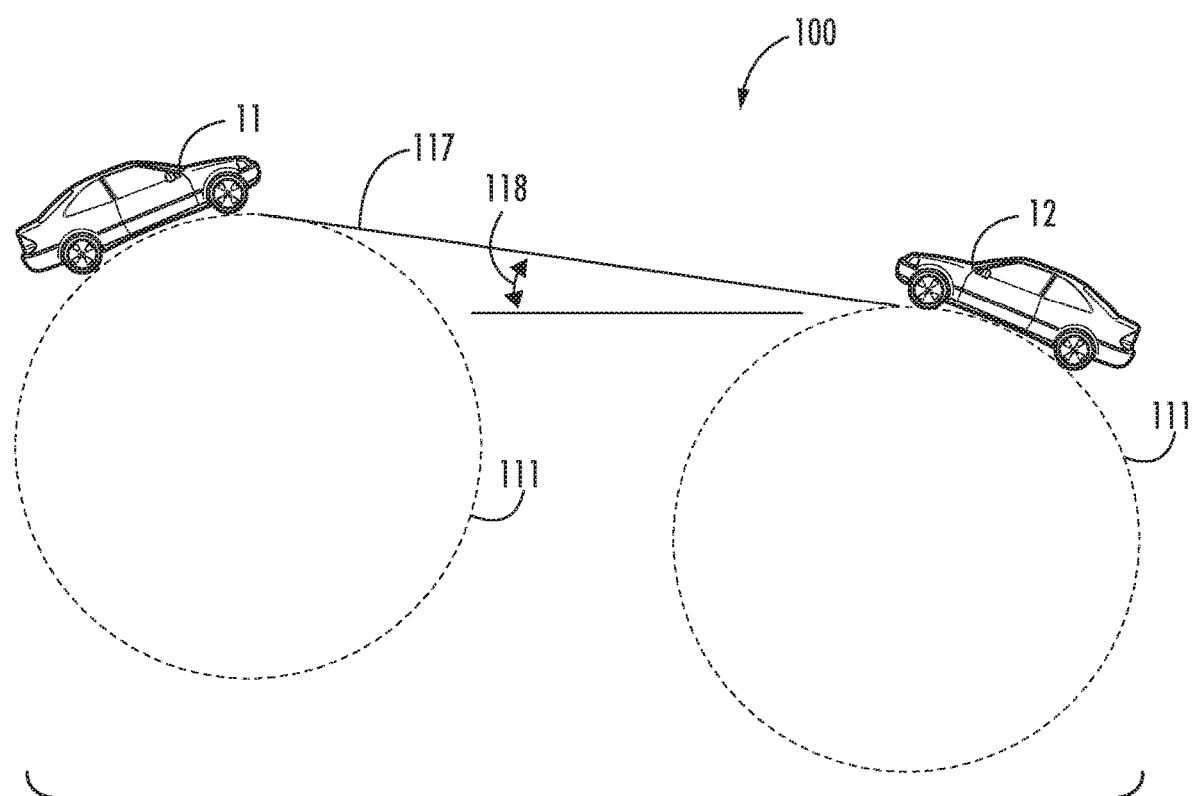

In FIG. 21, a circle 111 is positioned beneath the first machine 11 based upon the poses of the first and second machines 11, 12. A circle 111 is also positioned beneath the second machine 12 based upon the poses of the first and second machines 11, 12. In FIG. 22, a top common tangent line 117 is depicted that extends along and between the upper surface of the circle 111 associated with the first machine 11 and the upper surface of the circle 111 associated with the second machine 12.

If the angle 118 of the tangent line 117 relative to horizontal is greater than the maximum slope or grade of the work surface 101, a collision between the two machines will not occur because the work surface extending between the two machines must have a slope less than the tangent line. However, if the angle 118 of the tangent line 117 relative to horizontal is less than or equal to the maximum slope or grade of the work surface 101, a collision between the two machines may occur and the collision avoidance system 36 may operate by including the effects of gravity on the braking distance of the first machine 11.

Although generally described with the first and second machines 11, 12 operating at a work site 100, the collision avoidance system 36 may also be used in other environments such as on roads. As such, the collision avoidance system 36 may be used with automobiles, trucks, and other vehicles or machines regardless of their operating environment. Further, the collision avoidance system 36 may be used with systems that include maps for a work site or roads to provide for redundancy or in instances in which access to the maps is not available.

Still further, although described with the second machine 12 configured as a movable obstacle, the collision avoidance system 36 may also be used with fixed or stationary obstacles. In such case, the object detection sensors 35 of the object detection system 34 may generate object detection data indicating that the obstacle is not moving and thus is not subject to a maximum rate of grade change. Accordingly, a tangent line may not be drawn between the maximum rate of grade change curve of the first machine 11 and the fixed obstacle. In such case, the tangent line may extend from the maximum rate of grade change curve of the first machine 11 to a position generally adjacent the first obstacle and the comparison of the magnitude of the slope of the tangent line relative to the maximum permitted slope performed to determine whether a collision is possible.

INDUSTRIAL APPLICABILITY

The industrial applicability of the system described herein will be readily appreciated from the forgoing discussion. The foregoing discussion is applicable to machines such that move about a work site or other area along a work surface. Such system may be used at a mining site, a landfill, a quarry, a construction site, a roadwork site, a forest, a farm, a roadway, or any other area in which machine operation is desired.

The disclosed collision avoidance system 36 is operative to improve the efficiency and safety of machine operation by preventing or reducing the likelihood of false collision alert and/or by more accurately determining necessary braking distances for a machine. The collision avoidance system 36 analyzes the poses of the first and second machines 11, 12 and compares them to the maximum rate of grade change and the maximum permitted slope of the work surface to determine whether a collision is possible. In addition, based upon elevation differences between the first and second machines 11, 12, additional or less braking distance may be required for desired operation of the machines.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A propulsion and collision avoidance system associated with a machine, comprising:
    a ground engaging drive mechanism, the ground engaging drive mechanism being configured to engage a work surface and propel the machine about the work surface;
    a pose sensor configured to generate pose data indicative of a pose of the machine;
    a movement sensor configured to generate movement data of the machine indicative of movement of the machine;
    an object detection sensor configured to generate object detection data indicative of a pose of an obstacle spaced from the machine;
    a controller configured to:
        access a slope threshold defining a magnitude of a maximum slope of a work surface;
        generate propulsion commands to cause the ground engaging drive mechanism to propel the machine along the work surface;
        determine the pose of the machine based upon the pose data from the pose sensor;
        determine the movement of the machine based upon the movement data from the movement sensor;
        determine the pose of the obstacle based upon the object detection data from the object detection sensor;
        determine whether a collision will occur between the machine and the obstacle based upon the pose and the movement of the machine and the pose of the obstacle;
        determine a magnitude of a slope of a straight line between the machine and the obstacle based upon the pose of the machine and the pose of the obstacle;
        compare the magnitude of the slope of the straight line to the slope threshold;
        generate a collision alert after determining that a collision between the machine and the obstacle will occur and while the magnitude of the slope of the straight line is less than the slope threshold; and
        generate continuing propulsion commands to continue to cause the ground engaging drive mechanism to propel the machine along the work surface after determining that a collision between the machine and the obstacle will occur and while the magnitude of the slope of the straight line is greater than the slope threshold.

2. The system of claim 1, wherein the obstacle comprises a movable obstacle, and the controller is further configured to access a radius of a curve indicative of a maximum rate of grade change of the work surface, determine a position of a first maximum rate of grade change curve associated with the machine, determine a position of a second maximum rate of grade change curve associated with the movable obstacle, and wherein the straight line is a tangent line between at least one of the first maximum rate of grade change curve and the second maximum rate of grade change curve.

3. The system of claim 2, wherein the controller is further configured to determine whether a center of curvature of the first maximum rate of grade change curve is above or below the machine and whether a center of curvature of the second maximum rate of grade change curve is above or below the movable obstacle.

4. The system of claim 3, wherein the controller is further configured to determine whether the center of curvature of the first maximum rate of grade change curve is above or below the machine and whether the center of curvature of the second maximum rate of grade change curve is above or below the movable obstacle based upon elevation differences between the machine and the movable obstacle.

5. The system of claim 4, wherein the controller is further configured to determine whether the center of curvature of the first maximum rate of grade change curve is above or below the machine and whether the center of curvature of the second maximum rate of grade change curve is above or below the movable obstacle based upon a pitch of the machine and a pitch of the movable obstacle.

6. The system of claim 3, wherein the controller is further configured to determine a position of the tangent line based upon whether the center of curvature of the first maximum rate of grade change curve is above or below the machine and whether the center of curvature of the second maximum rate of grade change curve is above or below the movable obstacle.

7. The system of claim 1, wherein the controller is further configured to access a radius of a curve indicative of a maximum rate of grade change of the work surface, determine a position of a first maximum rate of grade change curve associated with the machine, and wherein the straight line is a tangent line tangent to the first maximum rate of grade change curve and extending to a location adjacent the obstacle.

8. The system of claim 1, wherein the controller is further configured to generate the collision alert based upon an elevation difference between the machine and the obstacle.

9. The system of claim 8, wherein the controller is further configured to determine the elevation difference based upon the pose of the machine and the pose of the obstacle.

10. The system of claim 1, wherein the controller is configured to determine the pose of the machine and the pose of the obstacle without a map of the work surface.

11. The system of claim 10, wherein the controller is further configured to determine the magnitude of the slope of the straight line without the map of the work surface.

12. The system of claim 1, wherein the object detection data generated by the object detection sensor is further indicative of movement of the obstacle, the controller is further configured to determine the movement of the obstacle based upon the object detection data from the object detection sensor and the determination of whether a collision will occur between the machine and the obstacle is further based upon the movement of the obstacle.

13. The system of claim 1, wherein the obstacle comprises a movable obstacle, and the object detection sensor comprises an obstacle pose sensor associated with the movable obstacle and configured to generate object pose data indicative of a pose of the movable obstacle and an obstacle movement sensor configured to generate obstacle movement data indicative of movement of the movable obstacle.

14. The system of claim 13, wherein the obstacle pose sensor and the obstacle movement sensor are disposed on the movable obstacle.

15. The system of claim 1, wherein the collision alert comprises generating a braking command to slow the machine.

16. A method of propelling a machine and avoiding a collision between the machine and an obstacle, comprising:
 accessing a slope threshold defining a maximum magnitude of a slope of a work surface;
 generating propulsion commands to cause a ground engaging drive mechanism to engage the work surface and propel the machine along the work surface;
 determining a pose of the machine based upon a pose data from a pose sensor;
 determining a movement of the machine based upon movement data from a movement sensor;
 determining a pose of the obstacle based upon object detection data from an object detection sensor;
 determining whether a collision will occur between the machine and the obstacle based upon the pose and the movement of the machine and the pose of the obstacle;
 determining a magnitude of a slope of a straight line between the machine and the obstacle based upon the pose of the machine and the pose of the obstacle;
 comparing the magnitude of the slope of the straight line to the slope threshold;
 generating a collision alert to slow the machine after determining that a collision between the machine and the obstacle will occur and while the magnitude of the slope of the straight line is less than the slope threshold; and
 generating continuing propulsion commands to continue to cause the ground engaging drive mechanism to propel the machine along the work surface after determining that a collision between the machine and the obstacle will occur and while the magnitude of the slope of the straight line is greater than the slope threshold.

17. The method of claim 16, wherein the obstacle comprises a movable obstacle, and further comprising accessing a radius of a curve indicative of a maximum rate of grade change of the work surface, determining a position of a first maximum rate of grade change curve associated with the machine, determining a position of a second maximum rate of grade change curve associated with the movable obstacle, and wherein the straight line is a tangent line between at least one of the first maximum rate of grade change curve and the second maximum rate of grade change curve.

18. The method of claim 16, further comprising generating the alert command based upon an elevation difference between the machine and the obstacle.

19. The method of claim 16, further comprising determining the pose of the machine, determining the pose of the obstacle, and determining the magnitude of the slope of the straight line without a map of the work surface.

20. A machine comprising:
 a ground engaging drive mechanism, the ground engaging drive mechanism being configured to engage a work surface and propel the machine about the work surface;
 a prime mover operatively connected to the ground engaging drive mechanism;
 a pose sensor configured to generate pose data indicative of a pose of the machine;
 a movement sensor configured to generate movement data of the machine indicative of movement of the machine;
 an object detection sensor configured to generate object detection data indicative of a pose of an obstacle spaced from the machine;
 a controller configured to:
  access a slope threshold defining a maximum magnitude of a slope of a work surface;
  generate propulsion commands to cause the ground engaging drive mechanism to propel the machine along the work surface;
  determine the pose of the machine based upon the pose data from the pose sensor;
  determine the movement of the machine based upon the movement data from the movement sensor;
  determine the pose of the obstacle based upon the object detection data from the object detection sensor;
  determine whether a collision will occur between the machine and the obstacle based upon the pose and the movement of the machine and the pose of the obstacle;
  determine a magnitude of a slope of a straight line between the machine and the obstacle based upon the pose of the machine and the pose of the obstacle;
  compare the magnitude of the slope of the straight line to the slope threshold;
  generate a collision alert after determining that a collision between the machine and the obstacle will occur and when while the magnitude of the slope of the straight line is less than the slope threshold; and
  generate continuing propulsion commands to continue to cause the ground engaging drive mechanism to propel the machine along the work surface after determining that a collision between the machine and the obstacle will occur and when while the magnitude of the slope of the straight line is greater than the slope threshold.

* * * * *